(12) United States Patent
Jeong et al.

(10) Patent No.: US 12,277,782 B2
(45) Date of Patent: Apr. 15, 2025

(54) ARTIFICIAL INTELLIGENCE DEVICE AND OPERATING METHOD THEREOF

(71) Applicant: LG ELECTRONICS INC., Seoul (KR)

(72) Inventors: Seoyoung Jeong, Seoul (KR); Seongik Jeon, Seoul (KR); Haesol Baek, Seoul (KR); Jeehoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 297 days.

(21) Appl. No.: 18/104,422

(22) Filed: Feb. 1, 2023

(65) Prior Publication Data
US 2024/0257542 A1    Aug. 1, 2024

(51) Int. Cl.
| | | |
|---|---|---|
| *G06T 7/70* | (2017.01) | |
| *G06T 7/20* | (2017.01) | |
| *G06V 10/25* | (2022.01) | |
| *G06V 20/68* | (2022.01) | |
| *G06V 40/10* | (2022.01) | |
| *H04N 23/62* | (2023.01) | |
| *H04N 23/667* | (2023.01) | |

(52) U.S. Cl.
CPC .............. *G06V 20/68* (2022.01); *G06T 7/20* (2013.01); *G06T 7/70* (2017.01); *G06V 10/25* (2022.01); *G06V 40/11* (2022.01); *H04N 23/62* (2023.01); *H04N 23/667* (2023.01); *G06V 2201/07* (2022.01)

(58) Field of Classification Search
CPC ........ G06V 20/68; G06V 10/25; G06V 40/11; G06V 2201/07; G06V 10/764; G06V 10/82; G06V 20/52; G06T 7/20; G06T 7/70; G06T 2207/20081; G06T 2207/20084; G06T 7/73; H04N 23/62; H04N 23/667
USPC ....................................................... 382/103
See application file for complete search history.

(56) References Cited

U.S. PATENT DOCUMENTS

| | | |
|---|---|---|
| 2010/0182136 A1 | 7/2010 | Pryor |
| 2019/0261459 A1 | 8/2019 | Cha et al. |
| 2022/0221161 A1 | 7/2022 | Cha et al. |
| 2022/0296037 A1* | 9/2022 | Spalding ................ G06V 20/00 |

FOREIGN PATENT DOCUMENTS

| | | |
|---|---|---|
| JP | 2020-41777 A | 3/2020 |
| KR | 10-2021-0092023 A | 7/2021 |

* cited by examiner

*Primary Examiner* — Stephen P Coleman
(74) *Attorney, Agent, or Firm* — Birch, Stewart, Kolasch & Birch, LLP

(57) ABSTRACT

An artificial intelligence range hood including a main body; a camera disposed at a lower end of the main body and configured to capture an image of a cooktop located under the main body; a display located on a front surface of the main body; a memory storing an object recognition model; and a processor configured to control the camera to capture the image of the cooktop, generate object recognition information for recognizing cooking objects included the captured image of the cooktop using the object recognition model stored in the memory, set a user region of interest of the captured image corresponding to a recognized cooking object designated by the generated object information, control an operation of the camera to photograph the user region of interest of the captured image, and control the display to display the photographed user region of interest of the captured image.

20 Claims, 26 Drawing Sheets

<RCP_PARTS_DTLS> PORK (50 G), CABBAGE (5 LEAVES), LEEKS (30 G), RICE (100 G), CARROTS (20 G), SHIITAKE MUSHROOM (2), ONIONS (50 G), ZUCCHINI (1/2), SNAILS (100 G), SOYBEAN PASTE (30 G) </RCP_PARTS_DTLS>    1253
<RCP_WAV2> STEAMING </RCP_WAV2>  ─── 1252
<MANUAL_IMG20/>
<MANUAL30/>
<RCP_SEQ>636<RCP_REQ>
<INFO_NA>976</INFO_NA>
<INFO_WGT/>
<INFO_PRO>22.3</INFO_PRO>  ─── 1254a
<MANUAL_IMG13/>
<MANUAL_IMG14/>
<MANUAL_IMG15/>
<MANUAL_IMG16/>
<MANUAL_IMG10/>
<MANUAL_IMG11/>
<MANUAL_IMG12/>
<MANUAL_IMG17/>
<MANUAL_IMG18/>
<MANUAL_IMG19/>
<INFO_FAT>4.2<INFO_FAT>  ─── 1254b
<HASH_TAG/>
<MANUAL_IMG02>http:www.foodsafetykorea.go.kr/uploadimg/cook/20_00636_2.png<MANUAL_IMG02>  ─── 1256a
<MANUAL_IMG03>http:www.foodsafetykorea.go.kr/uploadimg/cook/20_00636_3.png<MANUAL_IMG03>  ─── 1256b
<RCP_WAV2> ALA CARTE </RCP_WAV2>
<MANUAL_IMG04>http:www.foodsafetykorea.go.kr/uploadimg/cook/20_00636_4.png<MANUAL_IMG04>
<MANUAL_IMG05>http:www.foodsafetykorea.go.kr/uploadimg/cook/20_00636_5.png<MANUAL_IMG05>
<MANUAL_IMG01>http:www.foodsafetykorea.go.kr/uploadimg/cook/20_00636_1.png<MANUAL_IMG01>
<MANUAL01> 1. BLANCH CABBAGE LEAVES IN BOILING WATER </MANUAL01>  ─── 1257a
<ATT_FILE_NO_MK>http:www.foodsafetykorea.go.kr/uploadimg/cook/10_00636_1.png</ATT_FILE_NO_MK>
<MANUAL_IMG06>http:www.foodsafetykorea.go.kr/uploadimg/cook/20_00636_6.png<MANUAL_IMG06>
<MANUAL_IMG07/>
<MANUAL_IMG08/>
<MANUAL_IMG09/>
<MANUAL08/>                         1257b
<MANUAL09/>
<MANUAL06> 6. WHEN STEAM RISES IN STEAMER, ADD NO. 5 AND STEAM FOR ABOUT 5 MINUTES.</MANUAL06>
<MANUAL07/>
<MANUAL04> 4. ROLL RICE COOKED IN BLANCHED CABBAGE LEAVES.</MANUAL04>
<MANUAL05> 5. TIE THE ROLLED CABBAGE LEAVES WITH LEEKS.</MANUAL05>
<MANUAL02> 2. FINELY CHOP CARROTS, ZUCCHINI, SHIITAKE MUSHROOMS, AND ONIONS.</MANUAL02>
<MANUAL03> 3. SLICE PORK AND COOK WITH SOAKED RICE AND CHOPPED VEGETABLES </MANUAL03>
<ATT_FILE_NO_MAIN>http:www.foodsafetykorea.go.kr/uploadimg/cook/10_00636_2.png</ATT_FILE_NO_MAIN>
<MANUAL11/>
<MANUAL12/>
<MANUAL10/>
<INFO_CAR>43</INFO_CAR>  ─── 1254c
<MANUAL19>
<INFO_ENG>326.3</INFO_ENG>  ─── 1255
<MANUAL17/>
<MANUAL18/>
<RCP_NM> SOYBEAN PASTE SAUCE CABBAGE ROLLS WITH SNAILS </RCP_NM>  ─── 1251

FIG. 12C

| | | | | |
|---|---|---|---|---|
| 1291 — | DISH NAME | SOYBEAN PASTE SAUCE CABBAGE ROLLS WITH SNAILS | | |
| 1292 — | COOKING METHOD | STEAMING | | |
| 1298 — | COOKING VESSEL | STEAMER | | |
| 1293 — | INGREDIENT INFORMATION | PORK (50 G), CABBAGE (5 LEAVES), LEEKS (30 G), RICE (100 G), ONIONS (50 G), ZUCCHINI (1/2), SNAILS (100 G), SOYBEAN PASTE (30 G) | | |
| 1294a — | FIRST NUTRIENT INFORMATION | 22.3 | | |
| 1294b — | SECOND NUTRIENT INFORMATION | 7.2 | | |
| 1294c — | THIRD NUTRIENT INFORMATION | 43 | | |
| 1295 — | CALORIES | 326.3 | | |
| 1296a — | FIRST IMAGE | 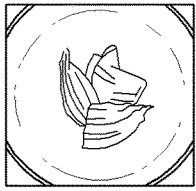 | | |
| 1296b — | SECOND IMAGE | 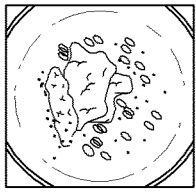 | | |
| 1297a — | FIRST TEXT | BLANCH CABBAGE LEAVES IN BOILING WATER | | |
| 1297b — | SECOND TEXT | WHEN STEAM RISES IN STEAMER, STEAM FOR ABOUT 5 MINUTES. | | |

1280

(a)     (b)   (c)

(a)

(b)

(c)

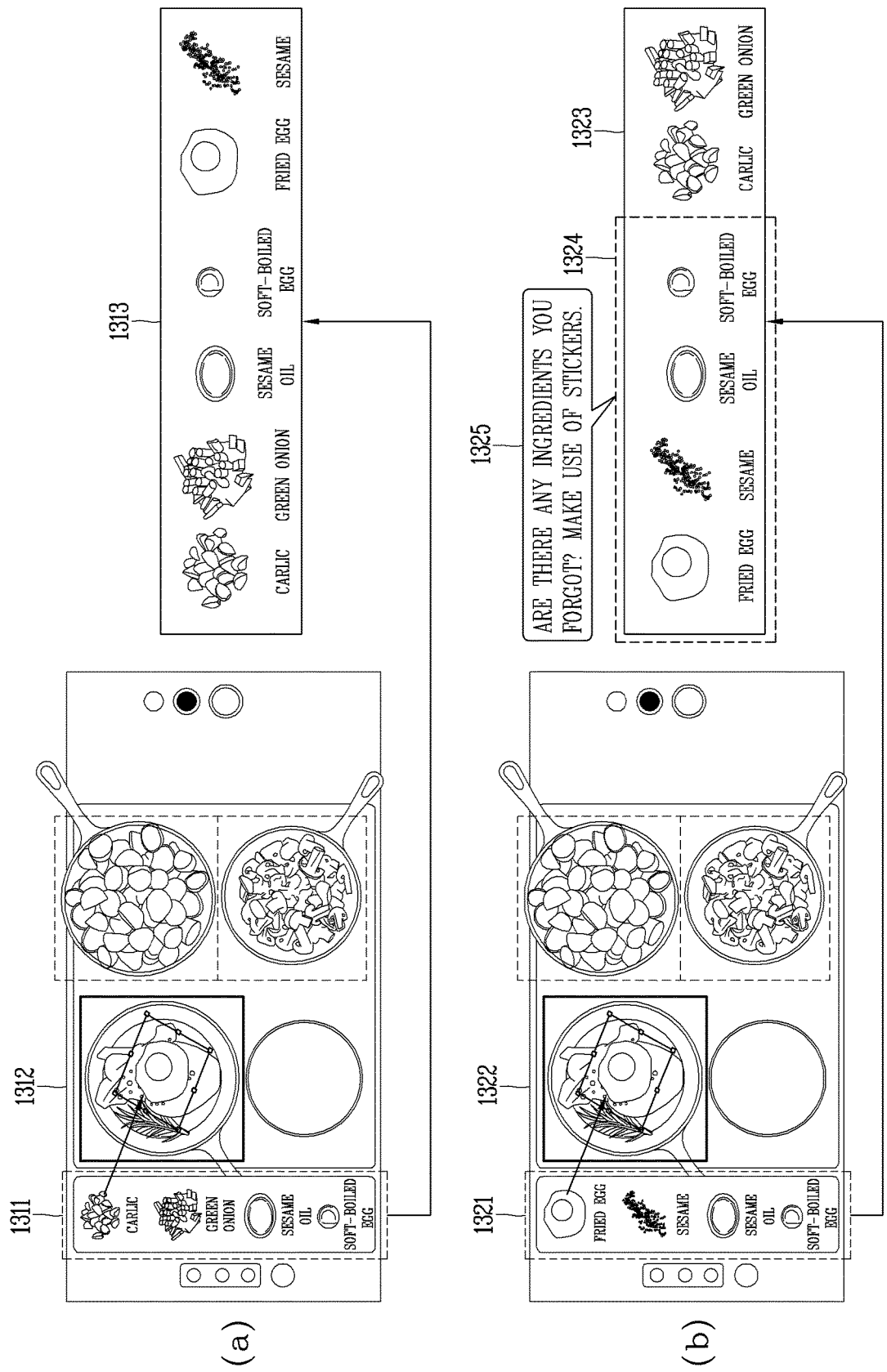

ARTIFICIAL INTELLIGENCE DEVICE AND OPERATING METHOD THEREOF

BACKGROUND OF THE INVENTION

Technical Field

The present disclosure relates to an artificial intelligence range hood including a camera photographing a cooking process performed on a top plate of a cooktop based on a user input.

Description of the Related Art

Artificial intelligence is a computer engineering and information technology field related to a computer thinking, learning, self-improving, and the like. Technologies for recognizing and learning surrounding situations using artificial intelligence, providing information desired by a user, or performing an operation or function desired by a user have been actively studied. Furthermore, an electronic device providing such various operations and functions can be referred to as an artificial intelligence device.

Also, an over-the-range (OTR) or range hood includes a microwave oven provided on a cooktop in a home. Further, a range hood located on the cooktop can discharge smoke and odor generated from a cooking vessel to the outside through a fan. The range hood is also installed along with the cooktop. However, the related range top including the camera does not allow a user to capture and easily share various recipe pictures and videos.

SUMMARY OF THE INVENTION

Accordingly, one aspect of the present disclosure is to address the above-noted and other problems with the related art method of capturing and providing cooking content.

Another aspect of the present disclosure is to provide an artificial intelligence range hood that photographs a cooking process performed on a top plate of a cooktop based on a user input, and a control method thereof.

Yet another aspect of the present disclosure is to provide an artificial intelligence range hood including a camera that photographs a top plate of a cooktop and a display that receives a user input while displaying the photographed image, and a control method thereof.

Still another aspect of the present disclosure is to provide an artificial intelligence range hood that recognizes a cooking zone, a cooking vessel, or food on a top plate of a cooktop to provide various camera UXs/UIs to a user, and a control method thereof.

Another aspect of the present disclosure is to provide an artificial intelligence range hood that recognizes an object located in a user's region of interest and automatically changes photographing conditions according to a feature of the recognized object, and a control method thereof.

Yet another aspect of the present disclosure is to provide an artificial intelligence range hood that adjusts an audio focus to a cooking zone region recognized as being cooked, and a control method thereof.

Still another aspect of the present disclosure is to provide an artificial intelligence range hood that provides various recipes using an open API, and a control method thereof.

In order to achieve the foregoing and other objectives, an artificial intelligence range hood according to an embodiment of the present disclosure includes a camera that photographs a top plate of a cooktop located under the range hood, a display located on a front surface of the main body to display an image captured by the camera, and a processor that acquires image data from an image captured using an object recognition model to generate object recognition information using the object recognition model. Further, the processor receives a user input based on screen information generated in association with the object recognition information being displayed on the display, and controls an operation of the camera according to the received user input.

In addition, the object recognition information can include object identification information and object location information on an object included in the acquired image data. The object identification information includes at least one of a cooking vessel, a food, a cooking utensil, and a user's hand, for example.

Also, the processor can recognize at least one of one or more cooking zones, cooking utensils, and food being cooked using the object recognition information, display one region including the recognized at least one of one or more cooking zones, cooking utensils, and food being cooked on the display, and set one region of the cooktop selected by a user in the one region displayed on the display as the user's region of interest.

The processor can also receive a user input including a time-lapse photographing speed and a photographing mode, and control the camera to photograph the user's region of interest according to the received user input.

Further, the processor can calculate a ratio of a region occupied by a food and a ratio of a region occupied by an object other than the food, respectively, within the user's region of interest using the object identification information and the object location information, increase the time-lapse photographing speed when the ratio of the region occupied by the food is greater than a preset first threshold, and decrease the time-lapse photographing speed when the ratio of the region occupied by the food is less than the first threshold and the ratio of the region occupied by the object other than the food is greater than a preset second threshold. Also, the first threshold is set as a reference value for determining a region occupied by a food within a user's region of interest, and the second threshold is set as a reference value for determining a region occupied by an object other than the food within the user's region of interest.

The memory can further store a food identification model, and when a food is included in the object identification information, the processor generates food identification information using the food identification model, and the food identification information identifies the type of the food included in the acquired image data. Also, the processor can generate color correction filter lists to display the lists on the display, and further receive one of the color correction filter lists as a user input.

The memory can further store a motion identification model, and when a user's hand is included in the object identification information, the processor generates motion identification information using the motion identification model, and the motion identification information identifies the motion type of the user's hand included in the acquired image data, the motion identification information including at least one of motion recognition start, thumb-up, thumb-down, zoom-in and zoom-out motions.

The processor can change a motion recognition mode to an ON state when the motion identification information is a motion recognition start motion, increase or decrease the time-lapse photographing speed when the motion identification information is one of thumb-up and thumb-down motions and the motion recognition mode is in an ON state, and zoom in or out a screen on which the user's region of interest is displayed when the motion identification information is one of zoom-in and zoom-out motions and the motion recognition mode is in an ON state.

Further, the artificial intelligence range hood can further include a plurality of microphones located at the lower end of the main body, such as directional microphones that receives an audio signal generated from a top plate of the cooktop. When the user's region of interest is set, the processor can move the audio focus of the microphone to the set user's region of interest.

Also, the processor can acquire first and second image data for a current frame and a previous frame from an image captured by the camera to calculate a similarity between the current frame and the previous frame, and determine the current frame as a first change point frame when the calculated similarity is less than a preset threshold similarity. The processor can generate a change point frame list including the first change point frame to display the generated change point frame list on the display, and receive a start frame and an end frame in the change point frame list as a user input to generate a highlight clip.

In addition, the similarity between the current frame and the previous frame can be calculated based on at least one of a color, an edge, a histogram, a correlation, and a motion vector of an optical flow extracted from first and second image data for the current frame and the previous frame. Also, the processor can generate first and second object recognition information from the first and second image data to calculate ratios occupied by a food region within the user's region of interest, respectively, and increase or decrease the threshold similarity based on the calculated ratios, respectively.

The processor can also generate a recipe DB based on recipe information collected through an open API to store the generated recipe DB in the memory, in which a plurality of recipes including one or more items of a dish name, a cooking method, ingredient information, a plurality of images illustrating the cooking method, and a plurality of texts describing the cooking method are stored in the recipe DB, and a cooking vessel item corresponding to the cooking method is generated and further included in the recipe.

The memory can further store a cooking vessel identification model, and the processor generates cooking vessel identification information using the cooking vessel identification model when a cooking vessel is included in the object identification information, and the cooking vessel identification information identifies the type of the cooking vessel included in the acquired image data.

The processor can also retrieve a cooking vessel item corresponding to the cooking vessel identification information from the recipe DB to extract one or more dish names related to the retrieved cooking vessel item, and generate a list of recommended dishes including the extracted one or more dish names to display the list on the display. In addition, the processor can receive one dish from the list of recommended dishes as a user input to extract a recipe related to the dish received as the user input from the recipe DB, and display at least one of a plurality of images illustrating a cooking method included in the extracted recipe and a plurality of texts describing the cooking method on the display.

The artificial intelligence range hood can further include a plurality of speakers, and the processor converts at least one of the plurality of texts describing the cooking method into a speech using a TTS engine stored in the memory, and outputs the converted speech through the plurality of speakers. The memory can further include an ingredient identification model, and when one or more ingredients are included in the object identification information, the processor generates one or more ingredient identification information using the ingredient identification model, and the ingredient identification information identifies the types of ingredients included in the acquired image data.

The processor can further generate additional information associated with the ingredient identification information to display the generated additional information on the display, in which the additional information is retrieved and generated from the recipe DB or an external server. The processor can also generate a recommended ingredient list based on ingredient information included in a recipe received as the user input and ingredient identification information on ingredients included in image data acquired by photographing the user's region of interest to display the generated recommended ingredient list on the display.

In order to achieve the foregoing and other objectives, according to an aspect of the present disclosure, the present disclosure further provides a method of controlling an artificial intelligence range hood, and which includes photographing a top plate of a cooktop located under the artificial intelligence range hood to display the photographed top plate on a display, acquiring image data from the photographed image to generate object recognition information using an object recognition model, receiving a user input based on screen information generated in association with the generated object recognition information to be displayed on the display, and controlling the operation of a camera according to the received user input.

In addition, the receiving of the user input can include recognizing at least one of one or more cooking zones, cooking vessels, or food being cooked using the object recognition information, displaying one region including at least one of the recognized one or more cooking zones, cooking vessels, or food being cooked on the display, setting one region of the cooktop selected by a user in the one region displayed on the display as a user's region of interest, and receiving a user input including a time-lapse photographing speed and a photographing mode, wherein the controlling of the operation of the camera includes controlling the camera to photograph the user's region of interest according to the received user input.

According to an embodiment of the present disclosure, the following effects can be achieved. One or more cooking zones and objects being cooked, which are located on a top plate of a cooktop, can be identified while photographing a cooking process performed on the top plate of the cooktop, thereby providing various camera UX/UI forms together with the photographed images.

Furthermore, a user's region of interest including at least one of one or more cooking zones, cooking vessels, and food being cooked can be set, and one or more objects located in the user's region of interest can be identified, thereby automatically changing photographing conditions according to the types and states of the identified objects. In addition, an audio focus can be moved to a user's region of interest including at least one of one or more cooking utensils, cooking vessels, and food being cooked, thereby mainly recording a sound generated from a cooking zone region being cooked.

Also, a recipe DB can be generated using an open API, and a cooking vessel recognized as being cooked can be identified, thereby providing a recipe associated with the identified cooking vessel to the user.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 12B is an exemplary view illustrating recipe information collected using an open API.

FIG. 12C is an exemplary view illustrating a recipe DB generated based on the collected recipe information.

FIG. 13B is an exemplary view illustrating a screen on which the recommended ingredient list is provided.

DETAILED DESCRIPTION OF THE EMBODIMENTS

Figure 1:
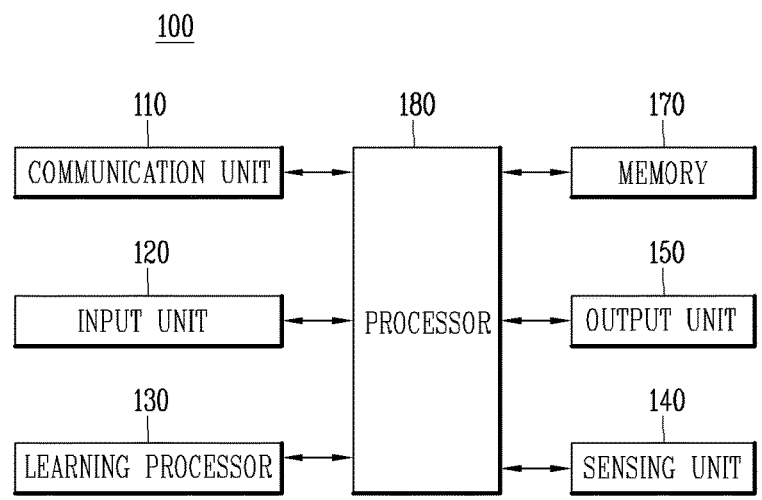
FIG. 1 is a block diagram illustrating an artificial intelligence (AI) device according to an embodiment of the present disclosure.

Description will now be given in detail according to exemplary embodiments disclosed herein, with reference to the accompanying drawings. For the sake of brief description with reference to the drawings, the same or equivalent elements may be provided with the same or similar reference numbers, and description thereof will not be repeated. A suffix "module" or "unit" used for elements disclosed in the following description is merely intended for easy description of the specification, and the suffix itself does not give any special meaning or function. Furthermore, the accompanying drawings are provided for a better understanding of the embodiments disclosed herein and are not intended to limit technical concepts disclosed herein, and therefore, it should be understood that the accompanying drawings include all modifications, equivalents and substitutes within the concept and technical scope of the present disclosure.

The terms including an ordinal number such as first, second, etc. can be used to describe various elements, but the elements should not be limited by those terms. These terms are only used to distinguish one element from another. When an element is referred to as being "connected to" or "coupled to" another element, the element can be connected to the other element or intervening elements can also be present. On the contrary, when an element is "directly connected to" or "directly coupled to" another element, another element is not present therebetween.

<Artificial Intelligence (AI)>

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and can mean the entire model having a problem-solving ability. The artificial neural network can be defined by a connection pattern between the neurons of different layers, a learning process of updating a model parameter, and an activation function for generating an output value.

The artificial neural network can include an input layer, an output layer, and optionally one or more hidden layers. Each layer includes one or more neurons. The artificial neural network can also include a synapse connecting neurons. In the artificial neural network, each neuron can output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network can determine a model parameter that minimizes a loss function. The loss function can be used as an index for determining an optimal model parameter in the learning process of an artificial neural network.

Machine learning can be classified into supervised learning, unsupervised learning, and reinforcement learning based on a learning method. Supervised learning means a method of training an artificial neural network in the state in which a label for learning data has been given. The label can mean an answer (or a result value) that must be deduced by an artificial neural network when learning data is input to the artificial neural network. Unsupervised learning means a method of training an artificial neural network when a label for learning data has not been given. Reinforcement learning means a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

An object detection model using machine learning can include a single-stage You Only Look Once (YOLO) model and a two-stage Faster Regions with Convolution Neural Networks (R-CNN) model. The YOLO model is a model in which an object existing in an image and a location of the object can be predicted by looking at the image only once.

The YOLO model divides an original image into grids having the same size. For each grid, the number of bounding boxes designated in a predefined form centered on the center of the grid is predicted to calculate reliability based thereon. Then, whether the image contains the object or only a background may be included therein, and a location with a high object reliability can be selected to identify an object category. The R-CNN model is a model capable of detecting an object faster than a RCNN model and a Fast RCNN model.

The R-CNN model will be described in detail. First, a feature map is extracted from an image through a Convolution Neural Network (CNN) model. Based on the extracted feature map, a plurality of regions of interest (RoI) are extracted. RoI pooling is performed for each region of interest.

RoI pooling is a process of setting a grid such that a feature map on which the region of interest is projected conforms to a predetermined size of H×W, and extracting the largest value for each space included in each grid to extract the feature map having the size of H×W. A feature vector can be extracted from a feature map having a size of H×W, and object identification information can be obtained from the feature vector.

<Extended Reality (XR)>

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology can be applied to a head-mount display (HMD), a head-up display (HUD), a mobile phone, a tablet PC, a laptop, a desktop, TV, and a digital signage. A device to which the XR technology has been applied can be called an XR device.

Next, FIG. 1 is a block diagram illustrating an AI device 100 according to an embodiment of the present disclosure. The AI device 100 can be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the AI device 100 can include a communication unit 110, an input unit 120, a learning processor 130, a sensing unit 140, an output unit 150, memory 170 and a processor 180. The communication unit 110 can transmit and receive data to and from external devices, such as other AI devices 100a to 100e or an AI server 200 illustrated in FIG. 3, using wired and wireless communication technologies. For instance, the communication unit 110 can transmit and receive sensor information, a user input, a learning model, and a control signal to and from external devices.

Also, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 can obtain various types of data and include a camera for inputting an image signal, a microphone for receiving an audio signal, and a user input unit 123 for receiving information from a user. Here, the camera or microphone can be treated as a sensor, and signals acquired from the camera or microphone can be referred to as sensing data or sensor information.

In addition, the input unit 120 can obtain learning data for model learning and input data to be used when an output is obtained using a learning model. The input unit 120 can also obtain not-processed input data, and the processor 180 or the learning processor 130 can extract an input feature by performing pre-processing on the input data.

Further, the learning processor 130 can be trained by a model configured with an artificial neural network using learning data. The trained artificial neural network can be called a learning model. In particular, the learning model is used to deduce a result value of new input data not learning data. The deduced value can then be used as a base for performing a given operation.

Figure 2:
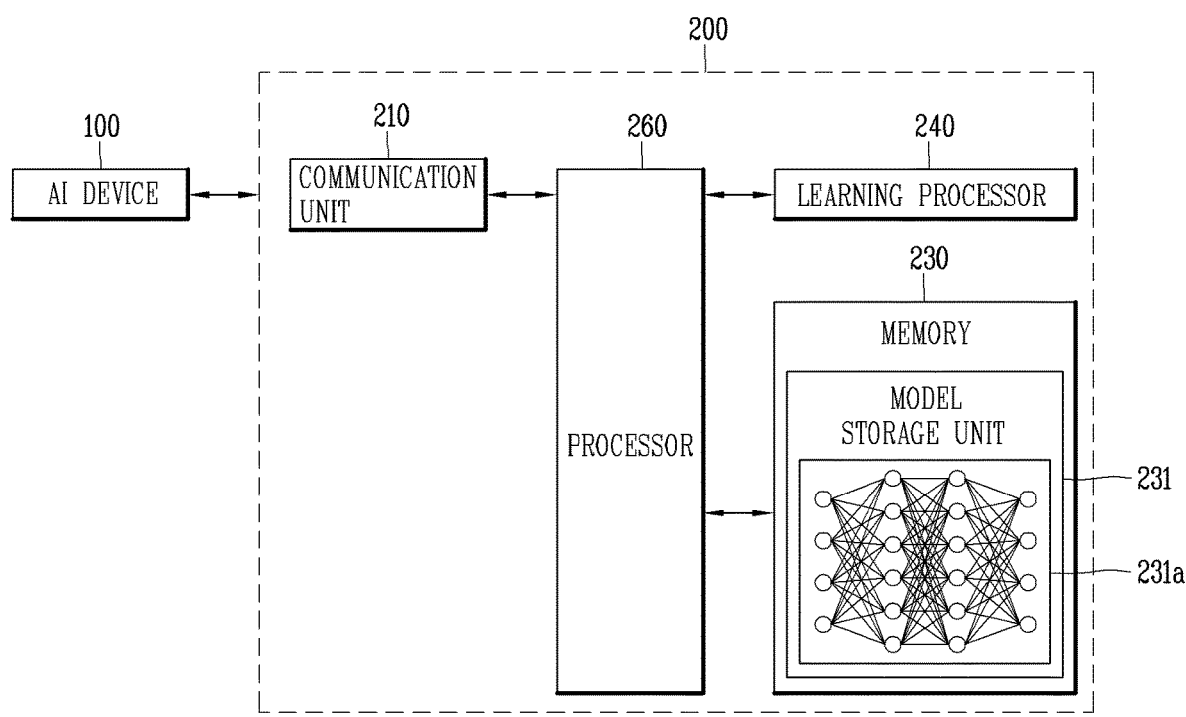
FIG. 2 is a block diagram illustrating an AI server according to an embodiment of the present disclosure.
Figure 3:
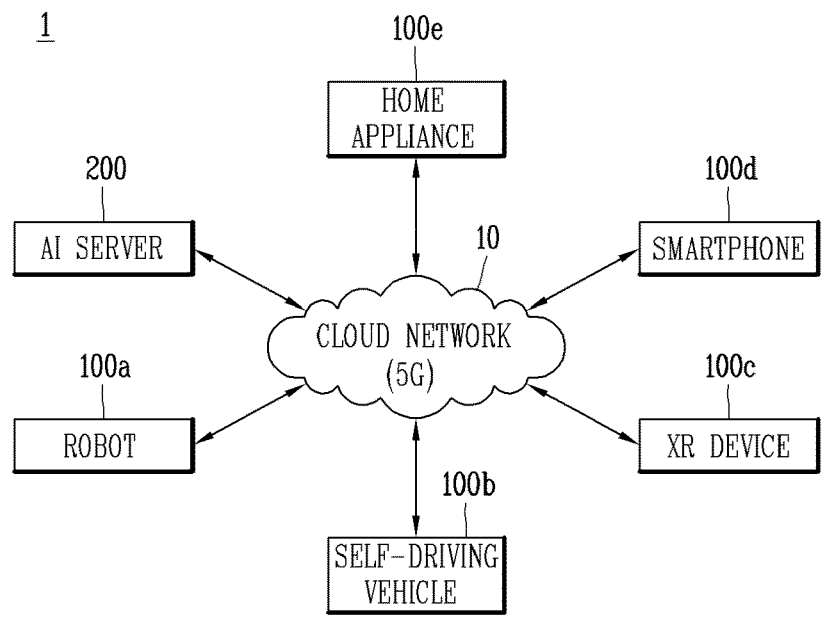
FIG. 3 is an overview illustrating an AI system according to an embodiment of the present disclosure.

The learning processor 130 can perform AI processing together with the learning processor 240 of the AI server 200 illustrated in FIGS. 2 and 3. The learning processor 130 can include memory integrated or implemented in the AI device 100. Alternatively, the learning processor 130 can be implemented using the memory 170, an external memory directly coupled to the AI device 100 or a memory maintained in an external device.

Further, the sensing unit 140 can obtain at least one of internal information of the AI device 100, surrounding environment information of the AI device 100, or user information using various sensors. In this instance, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

In addition, the output unit 150 can generate an output related to a visual sense, an auditory sense or a tactile sense. The output unit 150 can include a display module for outputting visual information, a speaker for outputting auditory information, and a haptic module for outputting tactile information.

Also, the memory 170 can store data supporting various functions of the AI device 100. For instance, the memory 170 can store input data obtained by the input unit 120, learning data, a learning model, a learning history, etc.

The processor 180 can also determine at least one executable operation of the AI device 100 based on information, determined or generated using a data analysis algorithm or a machine learning algorithm. Furthermore, the processor 180 can perform the determined operation by controlling elements of the AI device 100.

In addition, the processor 180 can request, search, receive, and use the data of the learning processor 130 or the memory 170, and control elements of the AI device 100 to execute a predicted operation or an operation determined to be preferred, among the at least one executable operation. If association with an external device is used to perform the determined operation, the processor 180 can generate a control signal for controlling the corresponding external device and transmit the generated control signal to the corresponding external device.

The processor 180 can also obtain intention information for a user input and transmit user requirements based on the obtained intention information. For example, the processor 180 can obtain the intention information, corresponding to the user input, using at least one of a speech-to-text (STT) engine for converting a voice input into a text string or a natural language processing (NLP) engine for obtaining intention information of a natural language.

At least one of the STT engine or the NLP engine can be configured as an artificial neural network trained based on a machine learning algorithm. Furthermore, at least one of the STT engine or the NLP engine can have been trained by the learning processor 130, can have been trained by the learning processor 240 of the AI server 200 illustrated in FIGS. 2 and 3, or can have been trained by distributed processing thereof.

Also, the processor 180 can collect history information including the operation contents of the AI device 100 or the feedback of a user for an operation, store the history information in the memory 170 or the learning processor 130, or transmit the history information to an external device, such as the AI server 200 illustrated in FIGS. 2 and 3. The collected history information can be used to update a learning model.

The processor 180 can control at least some of the elements of the AI device 100 to execute an application program stored in the memory 170. The processor 180 can also combine and drive two or more of the elements included in the AI device 100 to execute the application program.

Next, FIG. 2 is a block diagram illustrating an AI server 200 according to an embodiment of the present disclosure. Referring to FIG. 2, the AI server 200 corresponds to a device which is trained by an artificial neural network using a machine learning algorithm or which uses a trained artificial neural network. The AI server 200 is configured with a plurality of servers and can perform distributed processing and be defined as a 5G network. The AI server 200 can also be included as a partial configuration of the AI device 100, and can perform at least some of the AI processing.

Further, as shown in FIG. 2, the AI server 200 can include a communication unit 210, a memory 230, a learning processor 240 and a processor 260. The communication unit 210 can transmit and receive data to and from an external device, such as the AI device 100. Also, the memory 230 can include a model storage unit 231 storing a model (or artificial neural network 231a) which is being trained or has been trained through the learning processor 240.

The learning processor 240 can also train the artificial neural network 231a using learning data. The learning model can be used when it has been mounted on the AI server 200 of the artificial neural network or can be mounted on an external device, such as the AI device 100, and used.

Further, the learning model can be implemented as hardware, software or a combination of hardware and software. If some of or the entire learning model is implemented as software, one or more instructions configuring the learning model can be stored in the memory 230. The processor 260 can deduce a result value of new input data using the learning model, and generate a response or control command based on the deduced result value.

Next, FIG. 3 is an overview illustrating an AI system 1 according to an embodiment of the present disclosure. Referring to FIG. 3, the AI system 1 is connected to at least one of the AI server 200, a robot 100a, a self-driving vehicle 100b, an XR device 100c, a smartphone 100d or home appliances 100e over a cloud network 10. The robot 100a, the self-driving vehicle 100b, the XR device 100c, the smartphone 100d or the home appliances 100e to which the AI technology has been applied can be called AI devices 100a to 100e.

Further, the cloud network 10 can configure part of cloud computing infra or can mean a network present within cloud computing infra. The cloud network 10 can be configured using the 3G network, the 4G or long term evolution (LTE) network or the 5G network, for example. That is, the devices 100a to 100e (200) configuring the AI system 1 can be interconnected over the cloud network 10. Particularly, the devices 100a to 100e and 200 can communicate with each other through a base station, but can also directly communicate with each other without the intervention of a base station.

Further, the AI server 200 includes a server for performing AI processing and a server for performing calculation on a large amount of data. As shown in FIG. 3, the AI server 200 is connected to at least one of the robot 100a, the self-driving vehicle 100b, the XR device 100c, the smartphone 100d or the home appliances 100e, that is, AI devices configuring the AI system 1, over the cloud network 10, and can help at least some of the AI processing of the connected AI devices 100a to 100e.

Further, the AI server 200 can train an artificial neural network based on a machine learning algorithm in place of the AI devices 100a to 100e, directly store a learning model or transmit the learning model to the AI devices 100a to 100e. The AI server 200 can also receive input data from the AI devices 100a to 100e, deduce a result value of the received input data using the learning model, generate a response or control command based on the deduced result value, and transmit the response or control command to the AI devices 100a to 100e. Alternatively, the AI devices 100a to 100e can directly deduce a result value of input data using a learning model, and generate a response or control command based on the deduced result value.

Hereinafter, various implementations of the AI devices 100a to 100e to which the above-described technology is applied are described. The AI devices 100a to 100e shown in FIG. 3 can be considered to be detailed implementations of the AI device 100 shown in FIG. 1.

⟨AI + XR⟩

An AI technology is applied to the XR device 100c, and the XR device 100c can be implemented as a head-mount display, a head-up display provided in a vehicle, television, a mobile phone, a smartphone, a computer, a wearable device, home appliances, a digital signage, a vehicle, a fixed type robot or a movable type robot. The XR device 100c can generate location data and attributes data for three-dimensional points by analyzing three-dimensional point cloud data or image data obtained through various sensors or from an external device, obtain information on a surrounding space or real object based on the generated location data and attributes data, and output an XR object by rendering the XR object. For instance, the XR device 100c can output an XR object, including additional information for a recognized object, by making the XR object correspond to the corresponding recognized object.

Also, the XR device 100c can perform the above operations using a learning model configured with at least one artificial neural network. For instance, the XR device 100c can recognize a real object in three-dimensional point cloud data or image data using a learning model, and provide information corresponding to the recognized real object. The learning model can have been directly trained in the XR device 100c or have been trained in an external device, such as the AI server 200.

In addition, the XR device 100c can directly generate results using a learning model and perform an operation, but can also perform an operation by transmitting sensor information to an external device, such as the AI server 200, and receiving results generated in response thereto.

Figure 4:
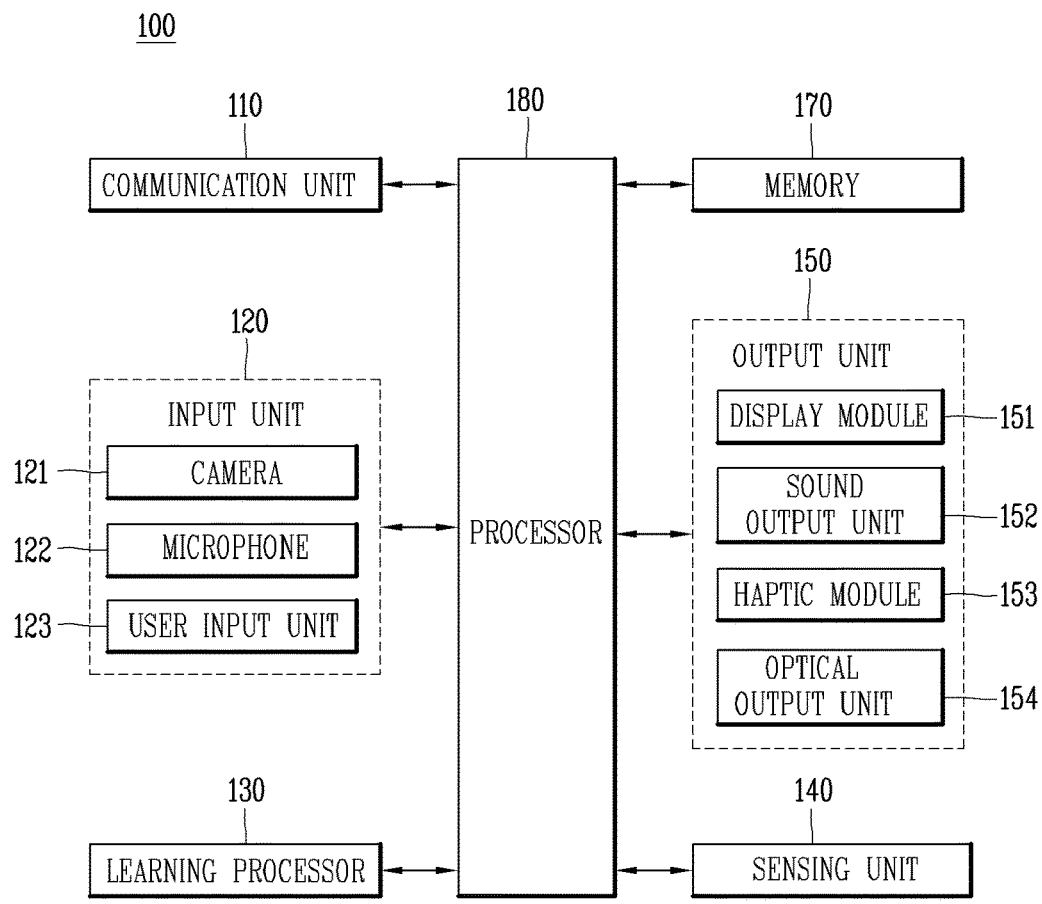
FIG. 4 is a block diagram illustrating an AI device according to another embodiment of the present disclosure.

Next, FIG. 4 is a block diagram showing an AI device 100 according to an embodiment of the present disclosure. Hereinafter, the AI device 100 can also be referred to as an artificial intelligence cooking device or an artificial intelligence range hood (over-the-range (OTR)).

As shown, the input unit 120 can include a camera 121 for receiving an image signal, a microphone 122 for receiving an audio signal, and a user input unit 123 for receiving information from a user. Speech data or image data collected by the input unit 120 can be analyzed and processed by a user's control command.

Further, the input unit 120 can receive video information (or signal), audio information (or signal), data or user input information. For reception of video information, the AI device 100 can include one or a plurality of cameras 121. The camera 121 can process image frames of still or moving images obtained by image sensors in a video call more or an image capture mode. The processed image frames can then be displayed on a display module 151 or stored in the memory 170.

Further, the microphone 122 processes an external acoustic signal into electrical speech data. The processed speech data can then be utilized in various manners according to a function being executed in the AI device 100 (or an application program being executed). The microphone 122 can also include various noise removal algorithms to remove noise generated in the process of receiving the external acoustic signal.

The user input unit 123 can receive information input by a user, and the processor 180 can control an operation of the AI device 100 to correspond to the input information. The user input unit 123 can include one or more of a mechanical input element (or a mechanical key, for instance, a button, a dome switch, a jog wheel, a jog switch, or the like located on a front and/or rear surface or a side surface of the AI device 100) and a touch-sensitive input element. For example, the touch-sensitive input element can be a virtual key, a soft key or a visual key, which is displayed on a touch screen through software processing, or a touch key which is located on the mobile terminal at a location that is other than the touch screen.

The output unit 150 can include at least one of a display module 151, a sound output unit 152, a haptic module 153, and an optical output unit 154. The display module 151 can display (output) information processed in the AI device 100. For instance, the display module 151 can display execution screen information of an application program running on the AI device 100 or user interface (UI) and graphic user interface (GUI) information in response to the execution screen information.

The display module 151 can have an inter-layered structure or an integrated structure with a touch sensor in order to implement a touch screen. The touch screen can provide an output interface between the AI device 100 and a user, as well as functioning as the user input unit 123 which provides an input interface between the electronic device 100 and the user.

Further, the sound output unit 152 can output audio data received from the communication unit 110 or stored in the memory 170 in a call signal reception mode, a call mode, a record mode, a speech recognition mode, a broadcast reception mode, and the like. The sound output unit 152 can include at least one of a receiver, a speaker, and a buzzer.

In addition, the haptic module 153 can generate various tactile effects that can be felt by a user. One example of a tactile effect generated by the haptic module 153 is vibration.

The optical output unit 154 can output a signal for indicating an event generation using the light of a light source of the AI device 100. Examples of events generated in the AI device 100 include a message reception, a call signal reception, a missed call, an alarm, a schedule notice, an email reception, an information reception through an application, and the like.

Figure 5:
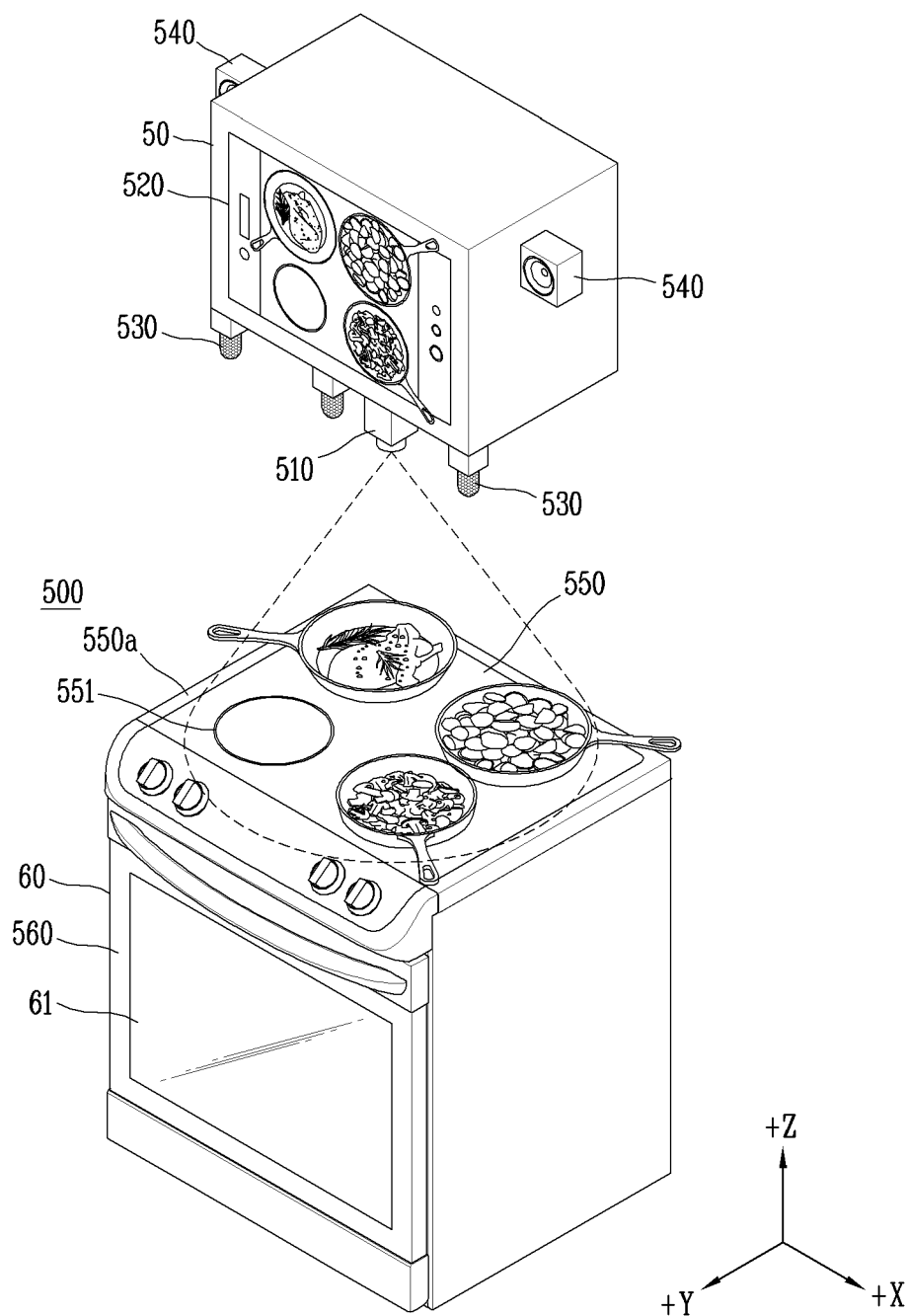
FIG. 5 is a perspective view illustrating an artificial intelligence range hood and a cooktop including a camera and a display according to an embodiment of the present disclosure.

Next, FIG. 5 is a perspective view illustrating an artificial intelligence range hood 100 and a cooktop 550 according to an embodiment of the present disclosure. Referring to FIG. 5, the artificial intelligence range hood 100 is located on a top plate 550a (e.g., +z axis direction) of a cooktop 550 and includes a main body 50, a camera 510, a display 520, a plurality of microphones 530 and a plurality of speakers 540.

In one embodiment, the display 520 is located on a front surface (e.g., +y axis direction) of the main body 50. The display 520 corresponds to the user input unit 123 of the input unit 120 and the display module 151 of the output unit 150 illustrated in FIG. 4. For instance, a touch screen capable of receiving a user input and displaying execution screen information of an application program running on the artificial intelligence range hood 100 can be implemented.

Further, the camera 510 can be located in one region of a bottom surface (e.g., −z axis direction) of the main body 50. In FIG. 5, the region where the camera 510 is located is merely an embodiment, and the camera 510 can be provided at various locations to photograph the top plate 550a of the cooktop 550 located at a lower end of the artificial intelligence range hood 100, such as a central region of the bottom surface of the artificial intelligence range hood 100. The camera 510 corresponds to the camera 121 of the input unit 120 illustrated in FIG. 4. Thus, cooking vessels, cooking utensils, food, and a user's hands located in a region of the top plate 550a of the cooktop 550 can be photographed to acquire image data such as still or moving images.

A plurality of microphones 530 can be located on a bottom surface (e.g., −z direction) of the main body 50. The microphone 530 corresponds to the microphone 122 of the input unit 120 illustrated in FIG. 4. For instance, the plurality of microphones 530 can include one or more directional microphones, and be provided at various locations to record various cooking sounds cooked on the top plate 550a of the cooktop 550 located at a lower end of the range hood 100.

Referring to FIG. 5, the artificial intelligence range hood 100 can further include a plurality of speakers 540. The speaker 540 corresponds to the sound output unit 152 of the output unit 120 illustrated in FIG. 4. For instance, a cooking sound recorded during a cooking process can be output or a spoken guide related to a recipe can be output.

In addition, the cooktop 550 located below the artificial intelligence range hood 100 (e.g., −z axis direction) can include one of an electric range, a gas range, and an induction range. Furthermore, the cooktop 550 can include a combination of an electric range, a gas range, and an induction range.

As shown, the cooktop 550 located under the artificial intelligence range hood 100 can include a plurality of cooking zones 551. When the cooktop 550 is a gas cooking device, the plurality of cooking zones 551 can burn gas supplied thereto. In addition, when the cooktop 550 is an electric range, the plurality of cooking zones 551 can generate heat using electricity supplied thereto, and heat the top plate 550a using the generated heat. Furthermore, when the cooktop 550 is an induction heating cooking device, the plurality of cooking zones 551 can generate an induced current using electricity supplied thereto, and directly heat a cooking vessel or a food inside the cooking vessel using the generated induced current.

In addition, an oven 560 located at a lower end of the cooktop 500 can generate high-temperature heat using gas or electricity, and cook food ingredients inside the cavity by air convection. A door 61 located in front of the main body 60 of the oven range 500 including the cooktop 550 and the oven 560 can rotate based on a hinge shaft. An operation panel and a display module for controlling or inputting an operation and/or function of the oven 560 can be located at an upper end of the door 61. Further, the artificial intelligence range hood 100 can absorb smoke, cooking vapor, and/or cooking odor generated during the cooking process through a cooking vessel placed on the top plate 550a of the cooktop 550.

Hereinafter, a basic operation of the artificial intelligence range hood will be described with reference to FIGS. 6A to 6C. FIG. 5 will also be referred to in this description. In particular, FIG. 6A is an operation flowchart in which the processor of the artificial intelligence range hood 100 controls the camera 510 and the display 520 provided in the artificial intelligence range hood 100, and FIG. 6B includes displayed images of a top plate region of a cooktop 550 photographed by the camera 510.

Figure 6A:
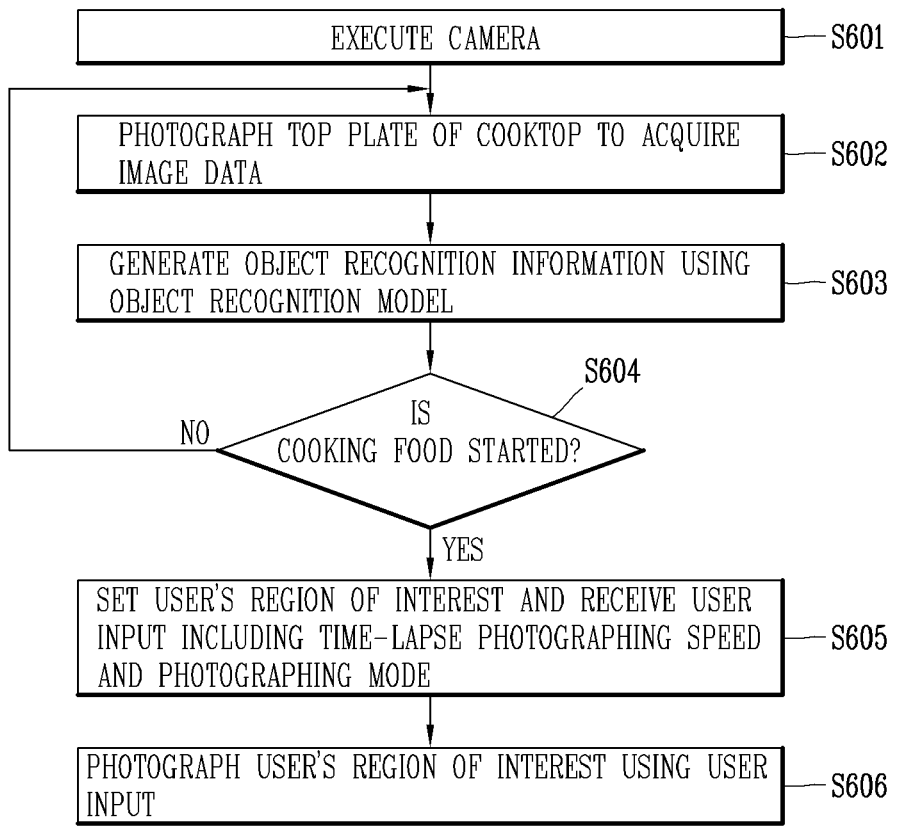
FIG. 6A is an operation flowchart that controls a camera and a display provided in an artificial intelligence range hood according to an embodiment of the present disclosure.

Referring to FIG. 6A, the processor of the artificial intelligence range hood 100 can control the camera 510 (S601) to acquire image data including at least one of a plurality of cooking zones, cooking vessels, or surrounding objects located in a top plate region of the cooktop 550 (S602). The camera 510 can photograph a plurality of cooking zones, cooking vessels, cooking utensils, food, and a user's hands located in the top plate region of the cooktop 550 to acquire image data such as still or moving images. Here, the food can refer to an object to be cooked, and can be located inside or outside the cooking vessel. That is, the food can include ingredients located in the top plate region of the cooktop.

In addition, the camera 510 can include at least one of an RGB camera that generates RGB image data, an IR camera that generates IR image data, a depth camera (or 3D camera) that generates depth image data, or an RGB-D camera that generates RGB-D image data. The depth camera can refer to a time-of-flight (ToF) camera.

Next, the processor of the artificial intelligence range hood 100 can generate object recognition information for an object included in the image data using an object recognition model stored in the memory (S603). The object recognition model can be received from an AI server through the communication unit of the artificial intelligence range hood 100 and stored in the memory. In addition, the object recognition model including an artificial neural network can be trained using a deep learning algorithm or a machine learning algorithm.

The processor then determines whether a cooking vessel, a cooking utensil, a food, a user's hand, or the like is included in the image data, and which region of the top plate 550a of the cooktop it is located when included therein using the object recognition model. That is, the processor can generate object recognition information on an object included in the image data using an object recognition model, and the object recognition information can include object identification information and object location information. The object identification information can include at least one of a cooking vessel, a cooking tool, a food, a user's hand, and the like. Furthermore, the object location information can include coordinate information (x, y) indicating the location of an object located on the cooktop 550.

The processor then determines whether the user has started cooking a food (S604). In more detail, the processor can recognize at least one of one or more cooking zones, cooking vessels, or food being cooked located in the top plate region of the cooktop 550 based on the object identification information to determine whether the user has started cooking a food. That is, the processor can determine that cooking has started when recognizing one or more cooking zones determined to be cooking or one or more of cooking vessels or food located in the top plate region of the cooktop 550. Here, the cooking zone determined to be cooking can refer to a cooking zone being heated by supplying an energy source thereto among a plurality of cooking zones located on the top plate 550*a* of the cooktop 550.

Figure 6B:
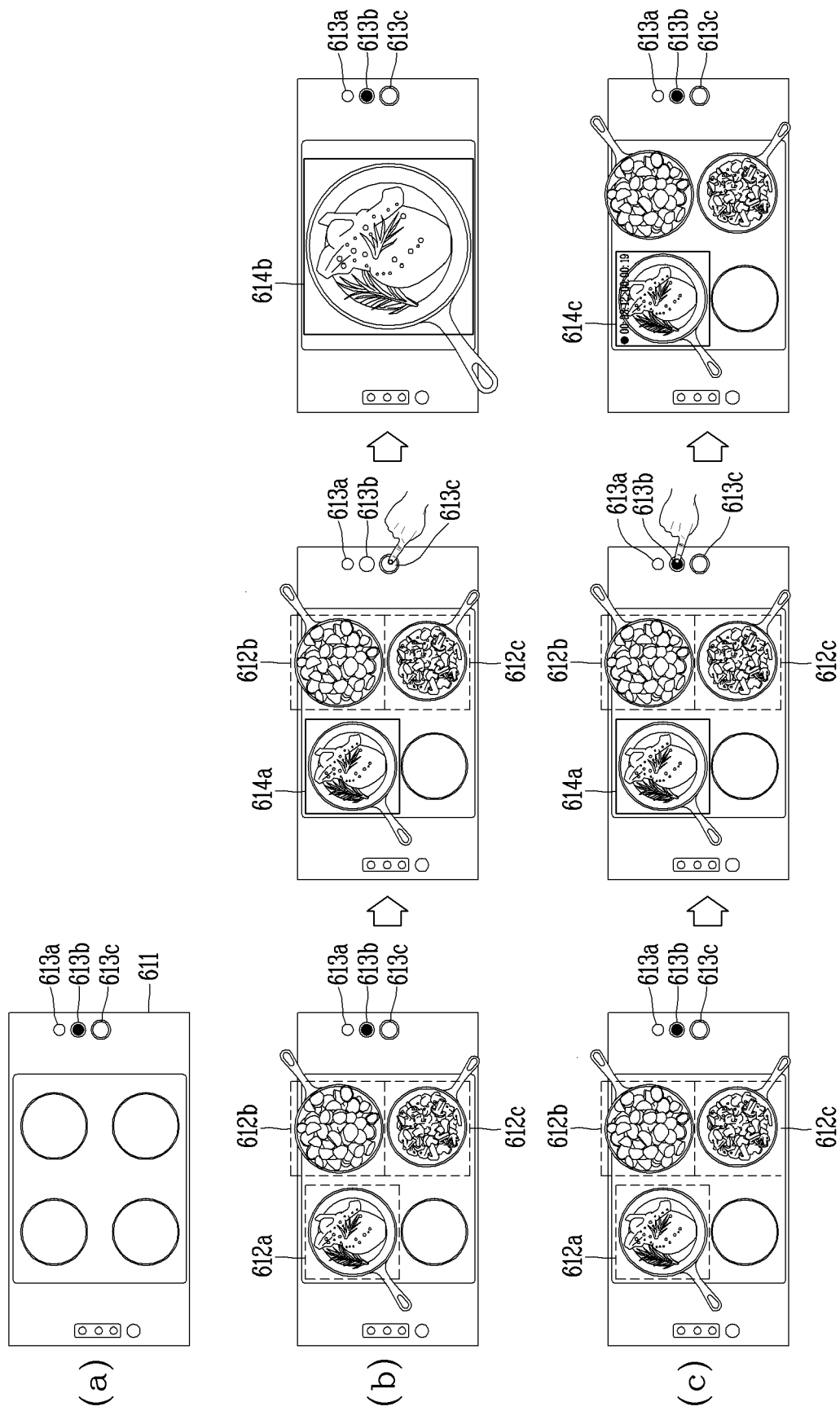
FIG. 6B includes overviews illustrating a top plate region of a cooktop photographed by a camera is displayed on a display.

When the processor determines that the user has not started cooking a food (No in S604), the processor displays a preview image 611 of the top plate region of the cooktop 550 on the display 520 as illustrated in FIG. 6B(a), and returns to the step S602 of acquiring image data. The preview image 611 can include the image generated by photographing the top plate region of the cooktop 550 by the camera 510, and user interfaces for receiving photographing conditions, such as a time control button 613*a*, a video shooting button 613*b*, and a photo capturing button 613*c*, as shown in FIG. 6B(a).

When the processor determines that the user has started cooking a food (Yes in S604), that is, when at least one of one or more cooking zones, cooking vessels, or food being cooked is recognized in the top plate region of the cooktop 550, the processor can set the user's region of interest and receive a user input including photographing conditions such as a time-lapse photographing speed and a photographing mode (S605).

Here, the user's region of interest can be one region of the cooktop top plate region including at least one of one or more cooking zones, cooking utensils, or food recognized as being cooked. Specifically, referring to FIG. 6B(b), one region of the cooktop top plate region including at least of one or more cooking zones, cooking vessels, or food recognized as being cooked can be displayed as regions 612*a* to 612*c* of a specific color. In addition, user interfaces for receiving photographing conditions, such as the time control button 613*a*, the video shooting button 613*b*, and the photo capturing button 613*c*, can be further displayed. Here, the time control button 613*a* is a user interface for setting the time-lapse photographing speed, and the video shooting button 613*b* and the photo capturing button 613*c* are user interfaces for selecting photographing modes.

In addition, the user can select one of the regions 612*a* to 612*c* that are determined to be cooking and displayed in a specific color. As illustrated in FIG. 6B(b), a region 614*a* selected by the user can be distinguished from the regions 612*a* to 612*c* that are determined to be cooking and displayed in a specific color, and displayed in another specific color, for example, a highlight or the like. In addition, the time-lapse photographing speed can be set using the time control button 613*a*, and the region 614*a* selected by the user can be recorded or photographed using the video shooting button 613*b* or the photo capturing button 613*c*. Hereinafter, for convenience of description, the one region 614*a* selected by the user among the regions 612*a* to 612*c* of the top plate region of the cooktop 550 is called a user's region of interest (ROI).

Next, referring back to FIG. 6A, the processor of the artificial intelligence range hood 100 can control the camera 510 to photograph the user's region of interest according to the user input including photographing conditions such as a time-lapse photographing speed and a photographing mode (S606). Furthermore, the processor can control still or moving images generated by photographing the user's region of interest by the camera 510 to be displayed on the display 520.

Specifically, a region including at least one of cooking zones, cooking utensils, or food selected by the user, that is, only the user's region of interest, can be photographed in a cropped manner, or a recording time can be displayed only in the user's region of interest and the remaining region can be processed in a blurred or dimmed manner. Specifically, referring to FIG. 6B(b), when the user selects one region 614*a* of the regions 612*a* to 612*c* that are determined to be cooking and displayed in a specific color and presses the photo capturing button 613*c*, the user's region of interest 614*a* can be processed and displayed as a crop screen 614*b*.

In addition, in an alternative embodiment as illustrated in FIG. 6B(c), a cooking time can be displayed only in the user's region of interest 614*c* for video recording, and the remaining region can be processed and displayed in a blurred or dimmed manner, but the present disclosure is not limited thereto.

Hereinafter, a method of generating object recognition information using an object recognition model will be described with reference to FIG. 6C. In particular, FIG. 6C(a) illustrates a method of generating object recognition information on an object included in image data using an object recognition model, and FIG. 6C(b) illustrates an embodiment of training an object recognition model.

Figure 6C:
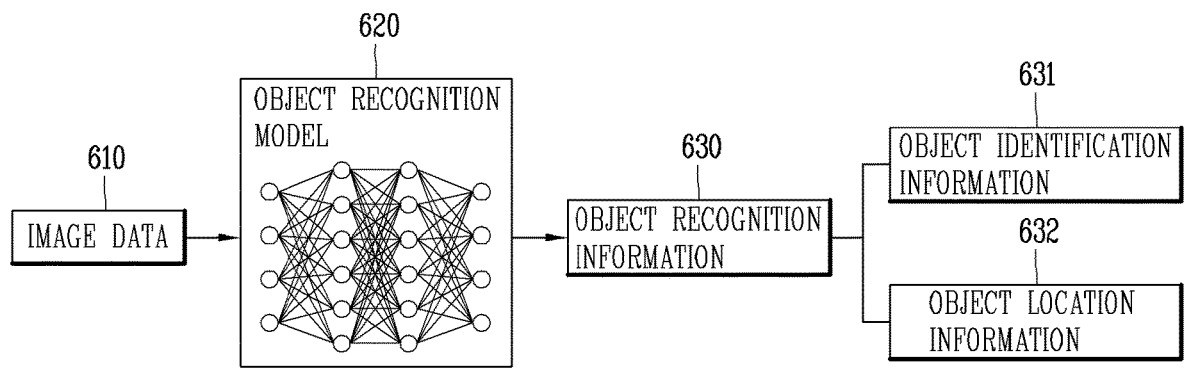
FIG. 6C is a conceptual view illustrating a method of generating object recognition information using an object recognition model.
Figure 6C:
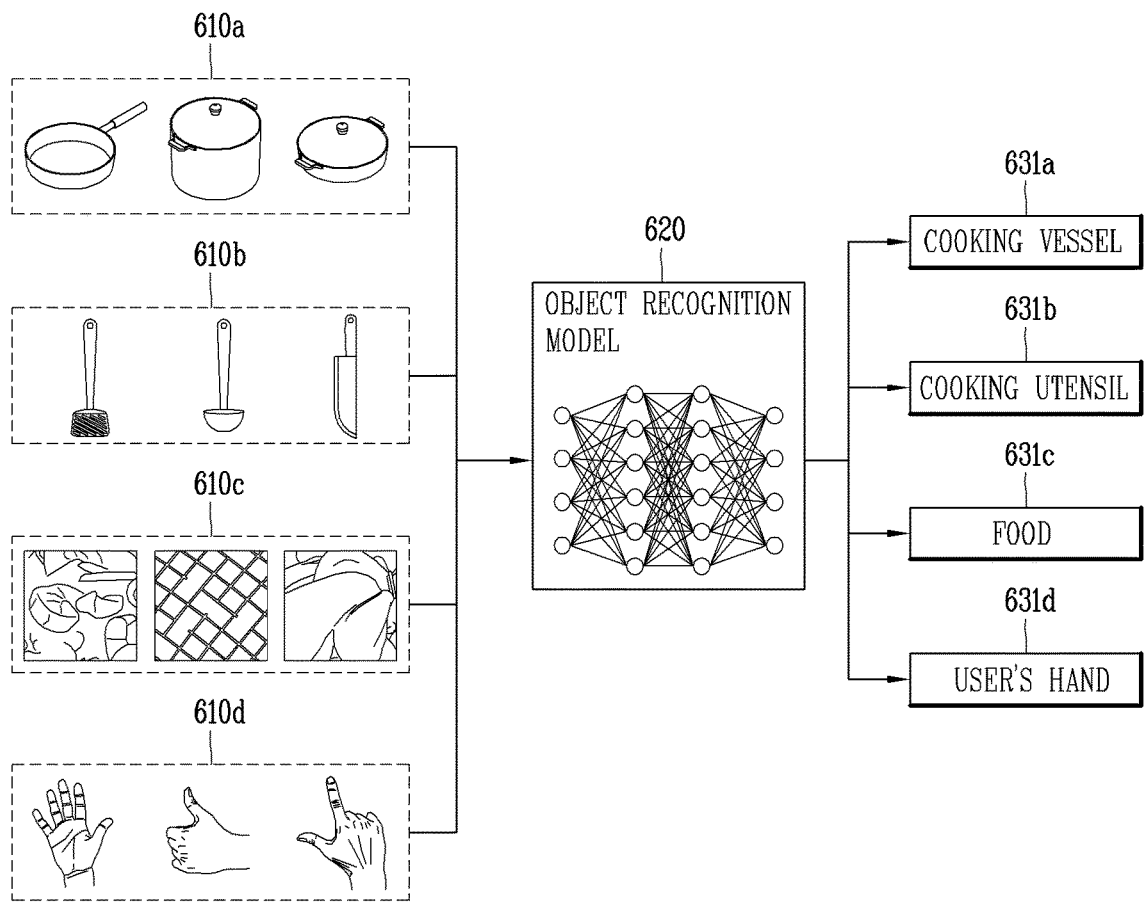

Referring to FIG. 6C(a), the processor of the artificial intelligence range hood 100 recognizes one or more objects included in image data 610 using an object recognition model 620, and generates object recognition information 630 on the recognized object. The object recognition information 630 can include object identification information 631 identifying the type of an object and object location information 632 indicating the location of an object.

The object recognition model 620 can be trained using a plurality of image data including an object and learning data labeled with object identification information on the object included in the image data. For example, FIG. 6C(b) illustrates an embodiment of training an object recognition model 620 using training image data 610*a* to 610*d* and training object identification information 631*a* to 631*d* labeled on the training image data 610*a* to 610*d*. Here, the training object identification information 631*a* to 631*d* can include at least one of cooking vessels, cooking utensils, food, and a user's hands.

Figure 7A:
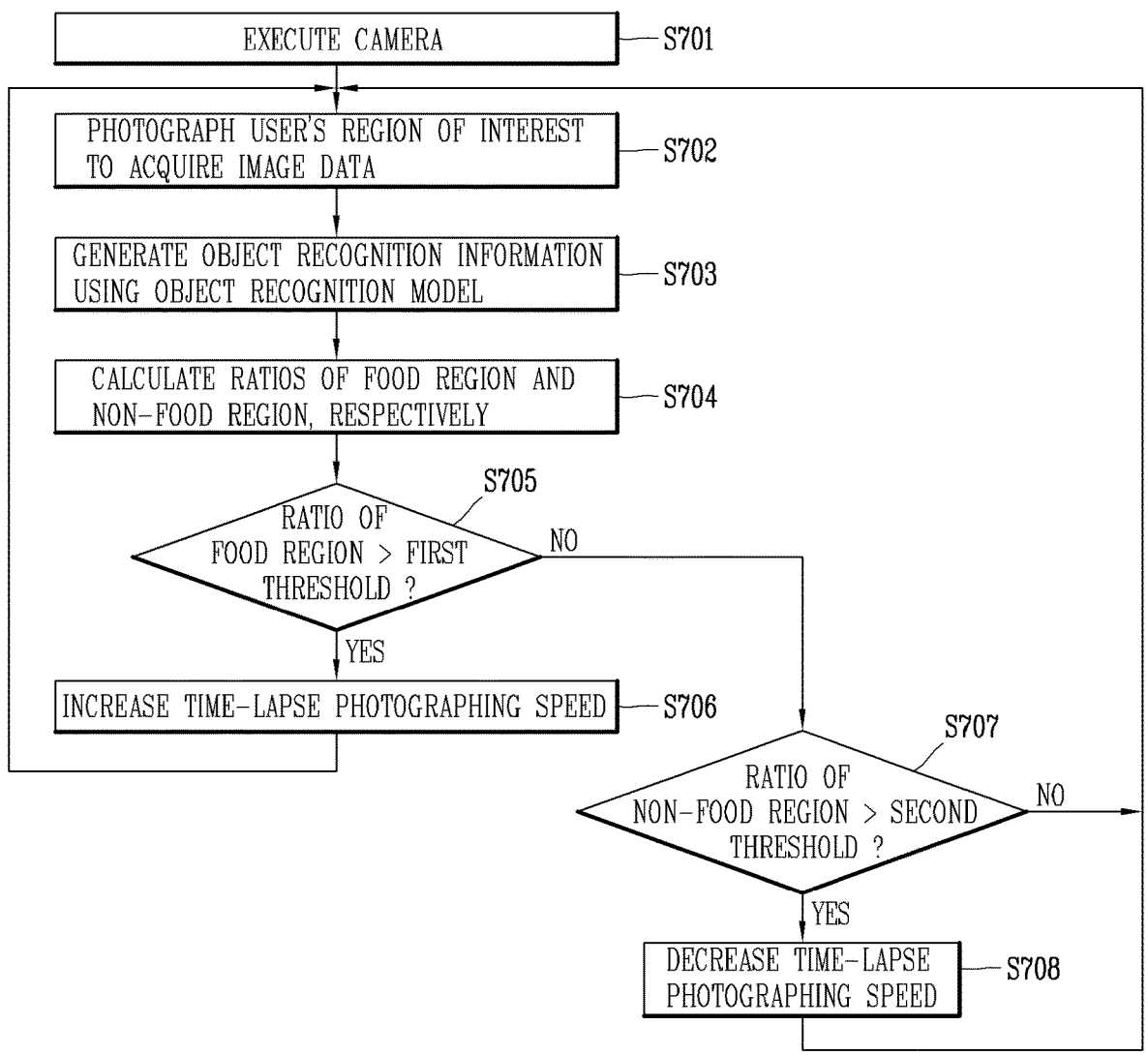
FIG. 7A is an operation flowchart illustrating a method of automatically adjusting a time-lapse photographing speed based on object recognition information according to an embodiment of the present disclosure.
Figure 7B:
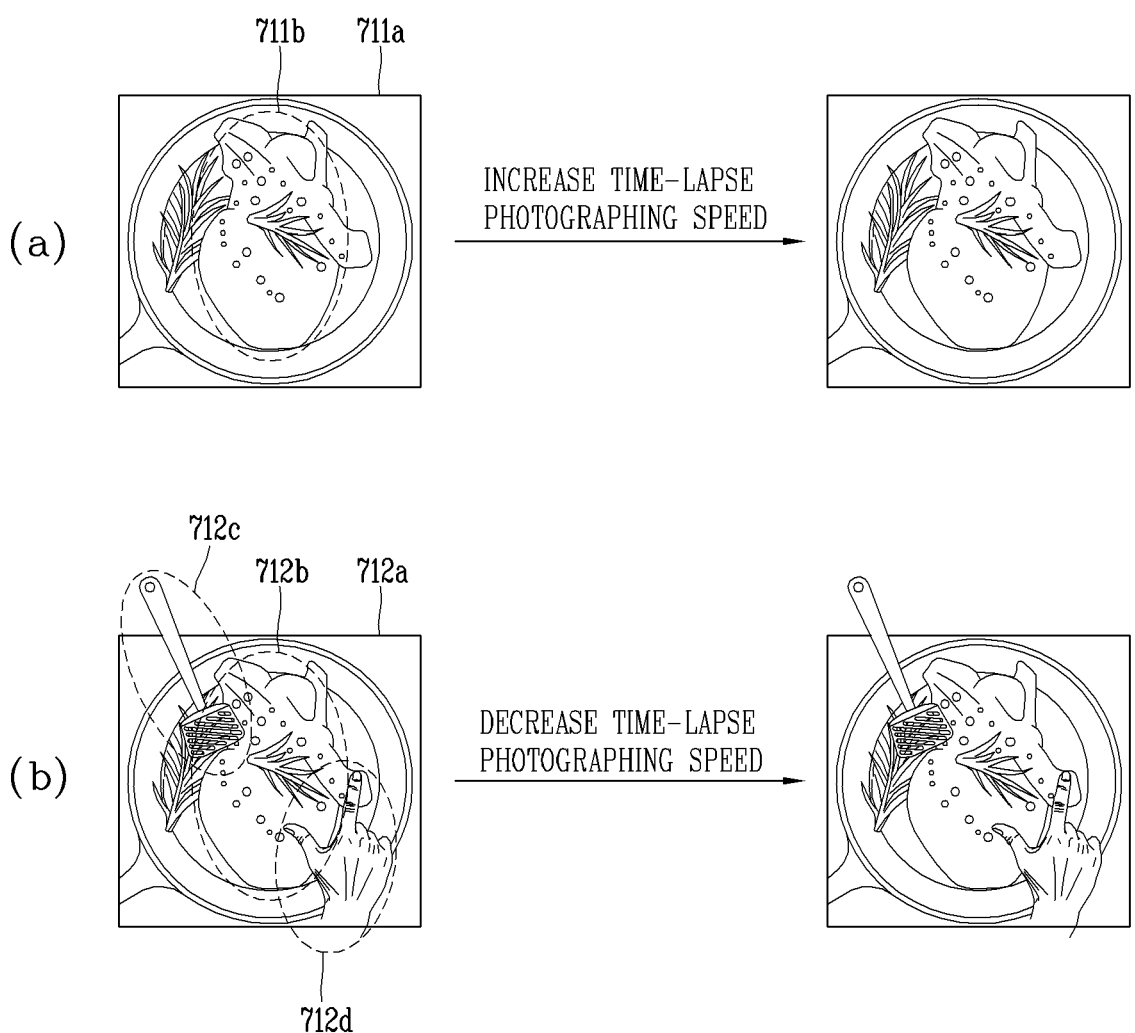
FIG. 7B includes overviews illustrating a screen on which the time-lapse photographing speed is automatically adjusted.

Hereinafter, FIGS. 7A and 7B illustrate a method of automatically adjusting a time-lapse photographing speed in the artificial intelligence range hood 100 will be described. In particular, FIG. 7A is an operation flowchart illustrating automatically adjusting a time-lapse photographing speed according to an embodiment of the present disclosure, and FIG. 7B includes display screens illustrating the time-lapse photographing speed being automatically adjusted.

Referring to FIG. 7A, the processor of the artificial intelligence range hood 100 can control the camera 510 (S701) to photograph a user's region of interest according to a user input, thereby obtaining image data (S702). The user input can include a time-lapse photographing speed and a photographing mode.

Next, the processor of the artificial intelligence range hood 100 can generate object recognition information for an object included in the image data using an object recognition model stored in the memory (S703). The processor can determine whether a cooking vessel, a cooking utensil, a food, a user's hand, or the like is included in the image data, and where it is located using the object recognition model. That is, the processor can generate object recognition information on an object included in the image data using an object recognition model, and the object recognition information can include object identification information and object location information.

Next, the processor of the artificial intelligence range hood 100 can calculate a ratio of a food region and a ratio of a non-food region, respectively, in the user's region of interest (S704). Specifically, the processor can recognize a food and an object (e.g., a cooking utensil or a user's hand) other than the food located within the user's region of interest based on the object identification information. Furthermore, based on the object location information, the locations of the recognized food and the object other than the food can be respectively identified. In addition, the processor can calculate a ratio of a food region, that is, a region occupied by a food, and a ratio of a non-food region, that is, a region occupied by an object other than the food, respectively, in the user's region of interest.

When the ratio of the food region in the user's region of interest is greater than a preset first threshold (Yes in S705), the processor can increase the time-lapse photographing speed (S706) to perform photographing. For example, as illustrated in FIG. 7B(a), when the ratio of a food region 711b within a user's region of interest 711a is calculated to be 70% or more, the processor can determine that there is little change in the cooking process. For example, the processor can determine that the cooking process is being completed. In this instance, the time-lapse photographing speed can be increased to a 5-times speed.

On the other hand, when the ratio of the food region within the user's region of interest is less than the first preset threshold and the ratio of the non-food region is greater than a second preset second threshold (No in S707), the processor can control the camera 510 to reduce the time-lapse photographing speed (S708). For example, as illustrated in FIG. 7B(b), when the ratio of a region 712b occupied by a food within a user's region of interest 712a is 70% or less, and the ratio of a region occupied by an object other than the food, such as a cooking utensil region 712c or a region 712d of the user's hand is 50% or more, the processor can determine that there is a large change in the cooking process. In this instance, the processor can control the camera 510 to automatically reduce the time-lapse photographing speed to one-time speed to perform photographing.

The foregoing first threshold can refer to a reference value for determining whether a cooking process has a large or small change based on a ratio of a region occupied by a food in a user's region of interest. For example, when a ratio occupied by a food region within a user's region of interest is greater than the first threshold of 70%, the processor can determine that there is a small change in the cooking process. In particular, the processor can determine that cooking process is being completed.

Furthermore, the second threshold can refer to a reference value for determining whether a cooking process has a large or small change based on a ratio of a region occupied by an object other than a food in a user's region of interest. For example, when a ratio of a region occupied by objects other than a food, such as a cooking utensil or a user's hand, within the user's region of interest is greater than the second threshold of 50%, the processor can determine that there is a large change in the cooking process.

Next, a method of providing a color correction filter based on the type of a food in the artificial intelligence range hood 100 will be described with reference to FIGS. 8A to 8C. In particular, FIG. 8A is an operation flowchart illustrating controlling a color correction filter list to be generated and applied according to the type of a food according to an embodiment of the present disclosure, and FIG. 8B includes display screens of providing and applying a recommended filter according to the type of a food.

Figure 8A:
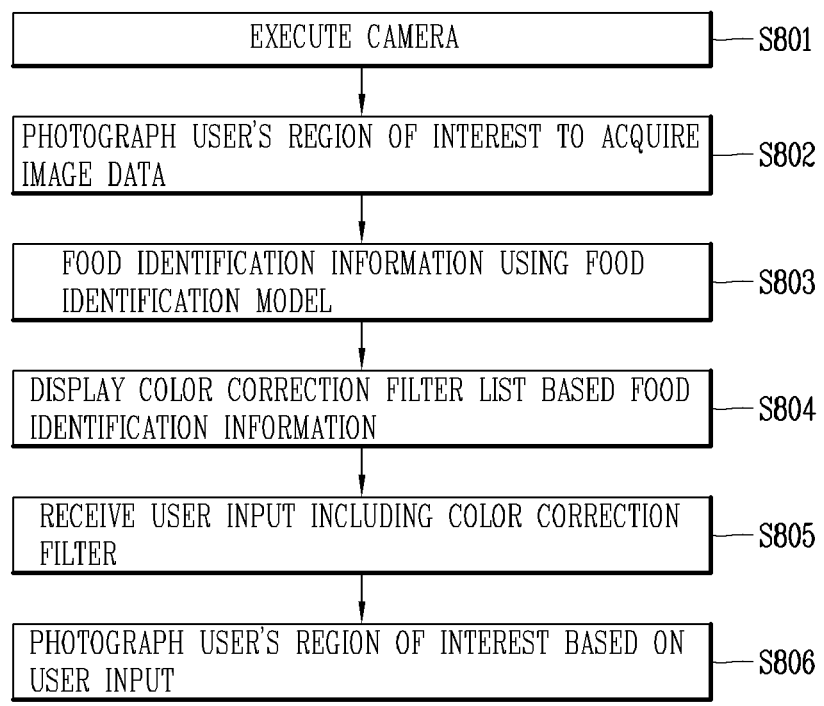
FIG. 8A is an operation flowchart illustrating a method of providing a color correction filter list based on food identification information according to an embodiment of the present disclosure.

Referring to FIG. 8A, the processor of the artificial intelligence range hood 100 can control the camera 510 (S801) to photograph a user's region of interest according to a user input, thereby acquiring image data (S802). Next, the processor can generate object recognition information on an object included in the image data using an object recognition model stored in the memory, and determine whether the object identification information included in the object recognition information includes a food. When the food is included in the object identification information as a result of the determination, food identification information on the food can be further generated using a food identification model stored in the memory (S803). Specifically, the processor can extract a food region included in the image data using the food identification model to generate food identification information for identifying the type of the food. For example, the food identification information can include at least one dish name such as kimchi stew, pizza, steak, and samgyetang.

The food identification model can be received from an AI server through the communication unit of the artificial intelligence range hood 100 and stored in the memory. In addition, the food identification model including an artificial neural network can be trained using a deep learning algorithm or a machine learning algorithm.

Next, the processor of the artificial intelligence range hood 100 can generate a color correction filter list based on the generated food identification information and provide the color correction filter list to the user (S804). The color correction filter list, which is provided to correct the color of the food region, can include one or more basic filters and a recommended filter according to the type of the food.

Next, the processor can receive a user input further including photographing conditions such as a time-lapse photographing speed, a photographing mode, and the like, and one color correction filter in the color correction filter list through the display 520 (S805). Next, the processor can control the camera 510 to photograph the user's region of interest based on the received user input (S806). That is, a color correction filter received as a user input can be applied to and photographed in the food region within the user's region of interest.

Also, the color correction filter selected by the user can be applied to the food region, photographed, and stored in the memory of the artificial intelligence range hood 100, and can be edited by the user through a gallery application installed in the artificial intelligence range hood.

Figure 8B:
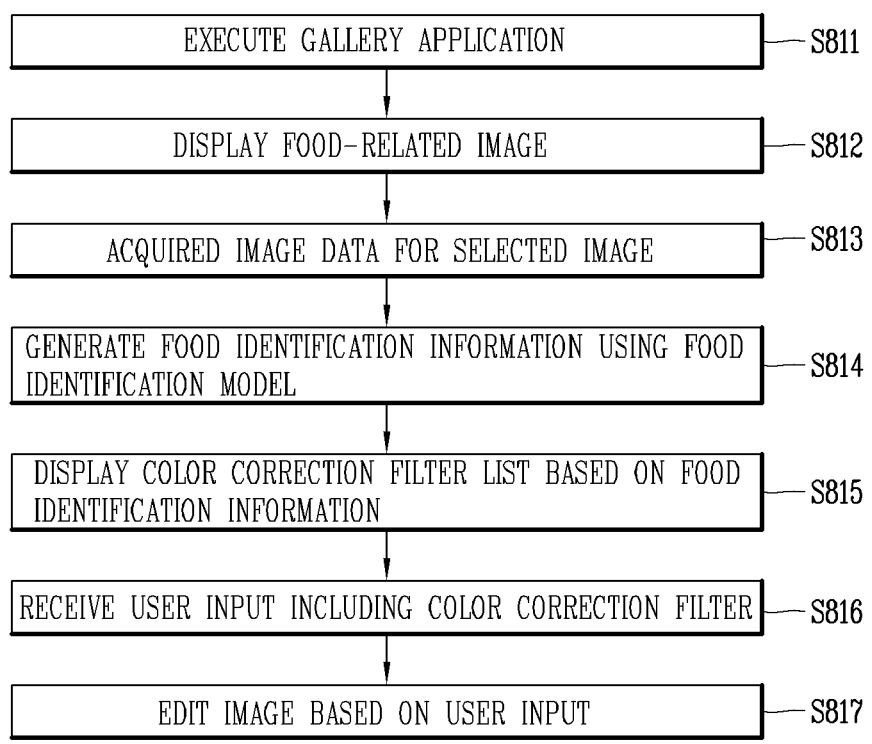
FIG. 8B is an operation flowchart illustrating a method of applying a color correction filter to a stored food-related image.

As shown in FIG. 8B, when the user enters an application related to photo and video editing installed in the artificial intelligence range hood 100, for example, a gallery application, the processor of the artificial intelligence range hood 100 can execute the gallery application (S811) to extract still and moving images related to a food stored in the memory and display the extracted still and moving images on the display 520 (S812). When the user selects one of the still and moving images displayed on the display 520, the processor can acquire image data from the selected image (S813).

The processor can then generate food identification information on the food using the food identification model stored in the memory (S814). Specifically, the processor can extract a food region included in the image data using the food identification model to generate food identification information for identifying the type of the food.

Next, the processor of the artificial intelligence range hood 100 can generate a color correction filter list based on the generated food identification information display the color correction filter list on the display (S815). The color correction filter list, which is provided to correct the color of the food, can include one or more basic filters and a recommended filter according to the type of the food.

Then, when one color correction filter in the color correction filter list is selected by the user (S816), the processor can control the selected color correction filter to be applied to a food region of the selected image for editing (S817). In addition, a photo or video photographed with the color correction filter applied thereto can be transmitted to and stored in the mobile electronic device 100*d* illustrated in FIG. 3 through the communication unit of the artificial intelligence range hood 100.

Then, it can be edited and stored by the user in the gallery application running on the mobile electronic device 100*d*. Specifically, the mobile electronic device 100*d* can receive a food identification model from the AI server and store the food identification model in the memory of the mobile electronic device 100*d*. When the user executes the gallery application installed in the mobile electronic device 100*d* to select a food-related image, food recognition information can be generated using the food identification model. Furthermore, based on food type identification information included in the food identification information, a filter list for color correction can be provided, and a color correction filter selected by the user can be applied to a food region of the food related image for editing.

Figure 8C:
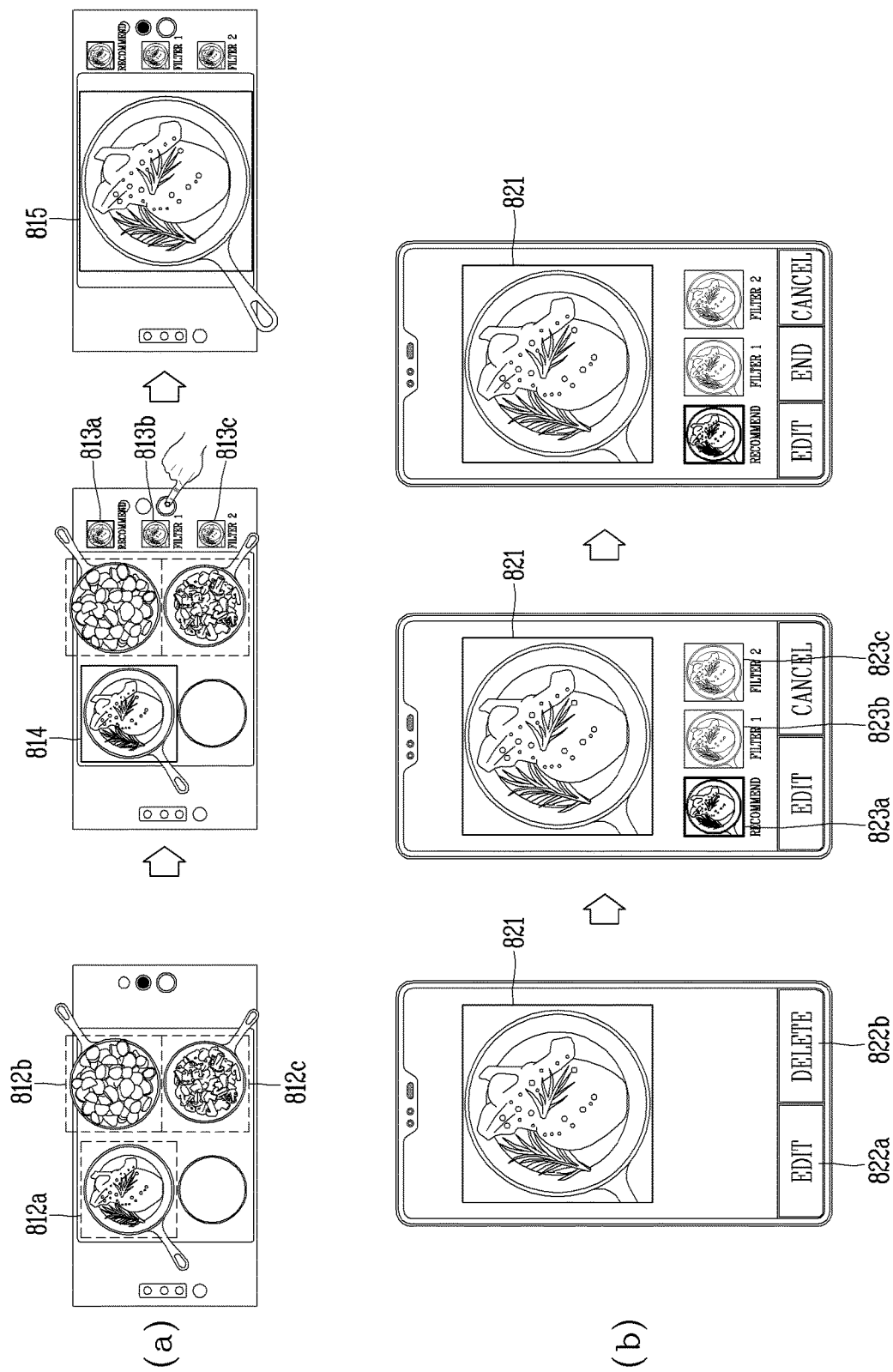
FIG. 8C includes overviews illustrating a screen that provides a color correction filter list.

Next, FIG. 8C(a) illustrates a process in which one or more color correction filter lists are displayed on the display 520 of the artificial intelligence range hood 100, and one filter is selected and applied by the user. First, one region of the cooktop top plate region including at least of one or more cooking zones, cooking vessels, or food recognized as being cooked can be displayed as regions 812*a* to 812*c* of a specific color. When the user selects one of the regions 812*a* to 812*c* that are recognized as being cooked and displayed in a specific color, the selected region 814 can be distinguished from the cooking zone regions 812*a* to 812*c* that are recognized as being cooked and displayed in another specific color, for example, a highlight or the like.

Next, the processor of the artificial intelligence range hood 100 can generate color correction filter lists 813*a* to 813*c* based on the food identification information generated using the food identification model, and provide or display them to the user. When the user selects one of the color correction filter lists 813*a* to 813*c*, the selected color filter can be applied to a food region in the user's region of interest 814. In addition, the processor can control the user's region of interest to be processed and displayed as a crop screen 815 in one region of the display 520. The food region within the user interest region 815 displayed on the display 520 can include an image to which a color correction filter selected by the user is applied.

FIG. 8C(b) illustrates a process of editing a food-related photo or video through a gallery application running on the mobile electronic device 100*d*. A similar process can be performed on a gallery application installed in the artificial intelligence range hood 100. Referring to FIG. 8C(b), the user can execute a gallery application running on the mobile electronic device 100*d*. When a food-related photo or video 821 is selected, a user interface including an edit button 822*a* and a delete button 822*b* can be displayed.

When the user selects the edit button 822*a*, food identification information can be generated using the food identification model stored in the memory, and color correction filter lists 823*a* to 823*c* can be displayed based on the food identification information. When the user selects one of the color correction filter lists 823*a* to 823*c*, the selected color correction filter can be applied to a food region of the food-related image 821 for edition.

Figure 8D:
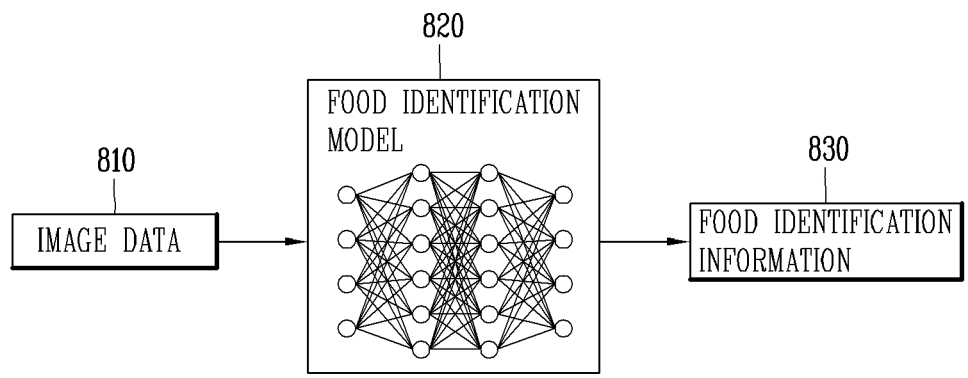
FIG. 8D is a conceptual view illustrating a method of generating food identification information using a food identification model.
Figure 8D:
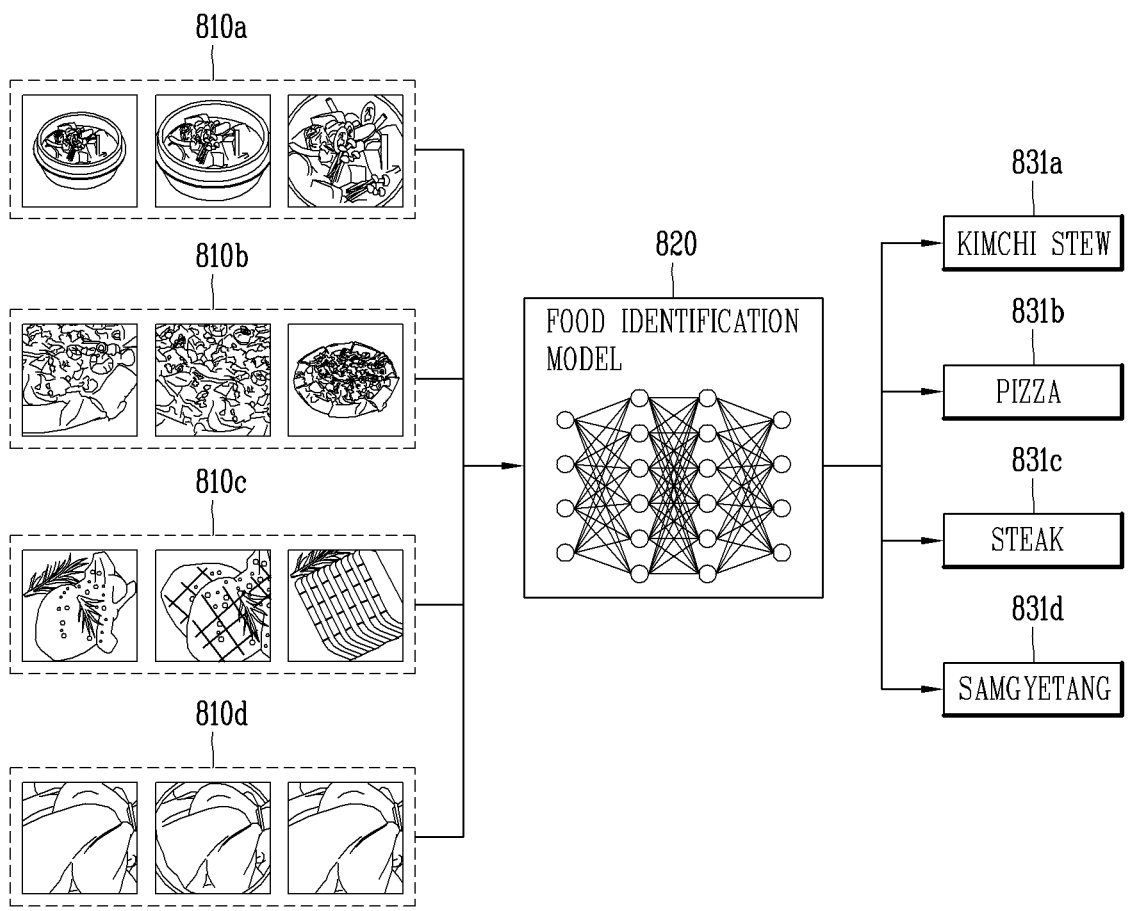

Hereinafter, a method of generating food identification information using a food identification model will be described with reference to FIG. 8D. Referring to FIG. 8D(a), the processor of the artificial intelligence range hood 100 generates food identification information 830 for identifying the type of a food included in image data 810 using a food identification model 820.

The food identification model 820 can be trained using the image data 810 including the food region and learning data labeled with food identification information 830 on the food included in the image data 810. For instance, FIG. 8D(b) illustrates an embodiment of training the food identification model 820 using training image data 810*a* to 810*d* and training food identification information 831*a* to 832*d* labeled on the training image data 810*a* to 810*d*. Here, the training food identification information 831*a* to 832*d* can include at least one of dish names such as kimchi stew, pizza, steak, and samgyetang. When image data including a food region acquired by the camera is received, food identification information corresponding to the relevant type of the food is generated.

Figure 9A:
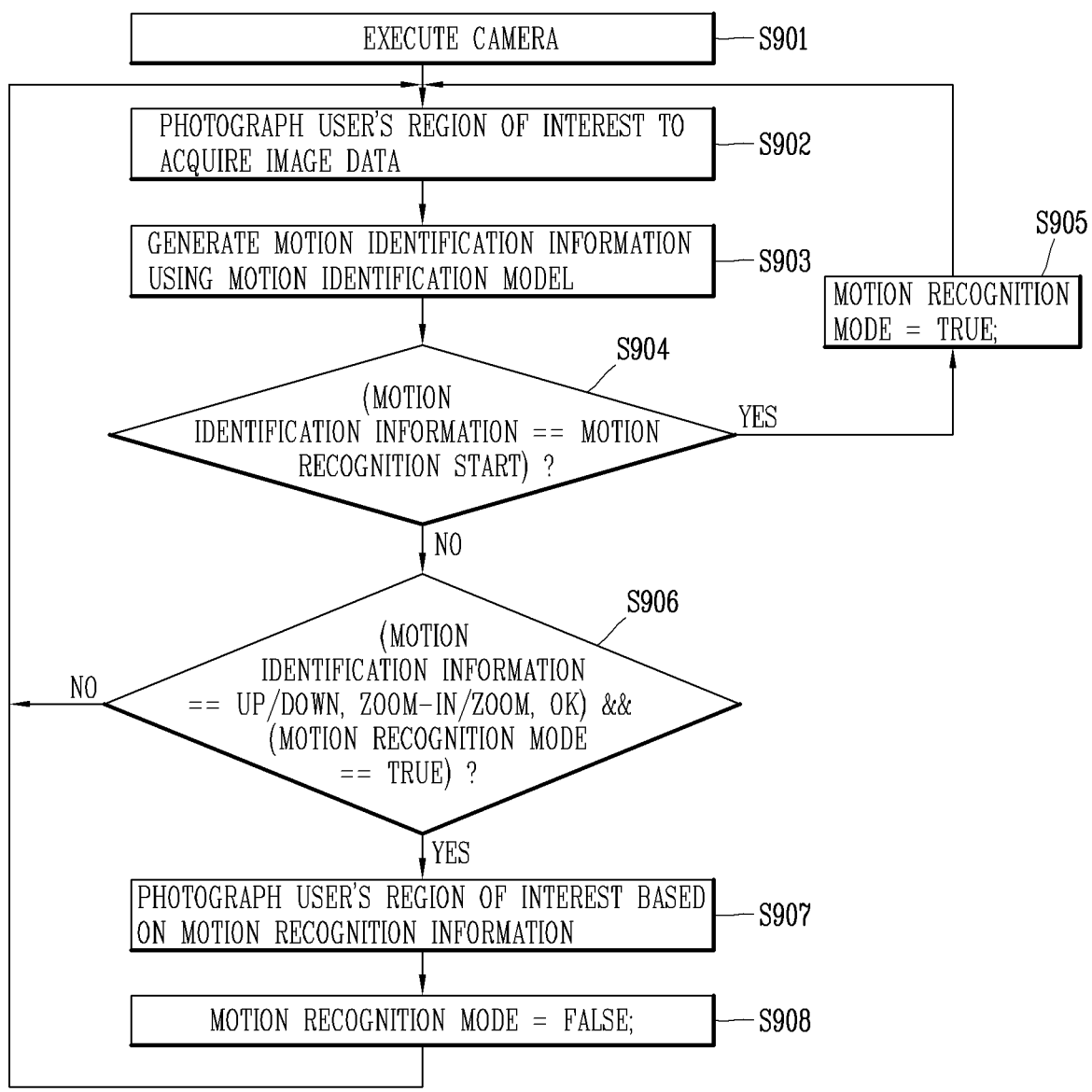
FIG. 9A is an operation flowchart illustrating a method of recognizing a user's hand motion to automatically adjust a cooking screen and a time-lapse photographing speed according to an embodiment of the present disclosure.

Hereinafter, a method of recognizing a user's hand motion in the artificial intelligence range hood to zoom in or out a cooking screen or automatically adjusting a time-lapse photographing speed will be described with reference to FIGS. 9A to 9C. Referring to FIG. 9A, the processor of the artificial intelligence range hood 100 can control the camera 510 (S901) to acquire image data including a user's region of interest (S902). Next, the processor can extract the user's hand region from the acquired image data using a motion identification model stored in the memory to generate motion identification information (S903).

The motion identification model including an artificial neural network can be trained using a deep learning algorithm or a machine learning algorithm. In addition, the motion identification information for identifying a user's hand motion can include at least one of motion recognition start, thumb-up, thumb-down, zoom-in, zoom-out, and OK.

Next, the processor can determine whether the user has made a hand gesture indicating a motion recognition operation within the user's region of interest based on the generated motion identification information (S904). When the processor determines the hand gesture is a motion recognition start operation (Yes in S904), the processor changes the motion recognition mode to an ON state (S905), and the returns to acquiring image data (S902).

When the processor determines the hand gesture is not a motion recognition start operation (No in S904), the processor can determine whether the motion identification information is one of thumb-up, thumb-down, zoom-in, zoom-out, and OK and whether the motion recognition mode is in an ON state. When the motion identification information is one of thumb-up, thumb-down, zoom-in, zoom-out, and OK and the motion recognition mode is in an ON state (Yes in S906), the operation can be controlled based on the motion identification information (S907), and the motion recognition mode can be changed to an OFF state (S908).

When the motion identification information is not a thumb-up, thumb-down, zoom-in, zoom-out, or OK, or the motion recognition mode is not in an ON state (No in S906), the processor returns to acquiring image data (S902).

Figure 9B:
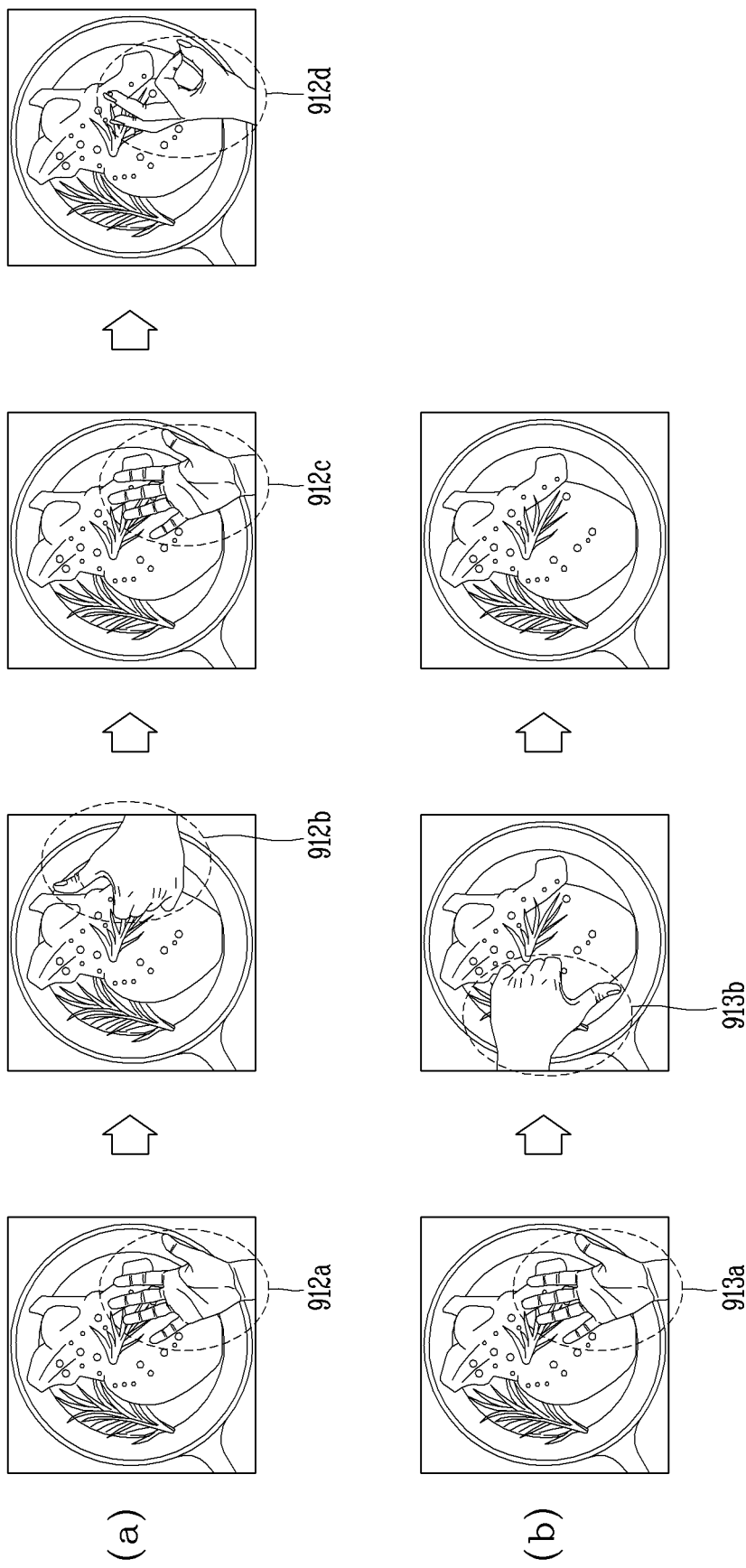
FIGS. 9B and 9C include overviews illustrating a cooking screen and a screen on which the time-lapse photographing speed is automatically adjusted based on the recognized user's hand motion.
Figure 9C:
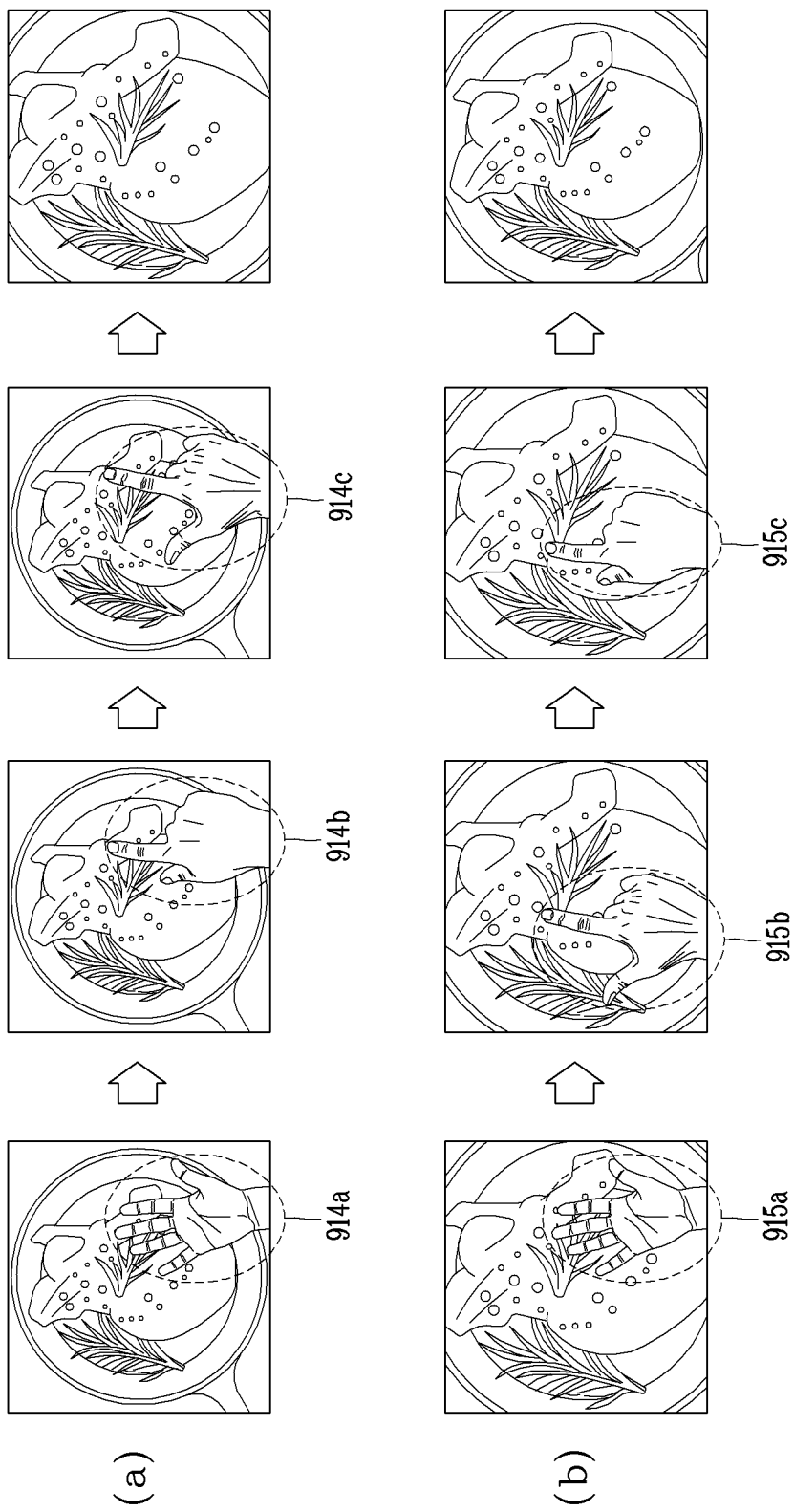

Next, FIGS. 9B and 9C illustrate an embodiment of recognizing a user's hand motion to automatically adjust a time-lapse photographing speed or to zoom in or out a cooking screen. Referring to FIG. 9B(a), when the user makes a hand gesture 912a indicating the start of motion recognition within the user's region of interest, the processor of the artificial intelligence range hood 100 can recognize that the user's hand motion is a motion recognition start operation based on the generated motion identification information, and change the motion recognition mode to an ON state.

When the user makes a hand gesture 912b indicating a thumb-up within the user's region of interest, the processor can recognize that the user's hand motion is a thumb-up motion based on the generated motion identification information. In addition, in response to the thumb-up motion, the processor can control the camera 510 to increase a time-lapse photographing speed by a preset range to perform photographing, and change the motion recognition mode to an OFF state.

When the user makes a hand gesture 912c indicating the start of motion recognition within the user's region of interest, the motion recognition mode is changed back to an ON state, and then when the user makes a hand gesture 912d indicating OK within the user's region of interest, the hand gesture indicating OK can be identified using a motion identification model to stop a time-lapse photographing speed adjustment, and change the motion recognition mode back to an OFF state.

When the time-lapse photographing speed reaches a preset maximum or minimum value during a time-lapse photographing speed adjustment, or when a hand gesture indicating a motion recognition start, thumb-up/down or OK is not recognized for a preset period of time afterwards, for example, within 10 seconds, the time-lapse photographing speed adjustment can be automatically stopped.

In addition, as illustrated in FIG. 9B(b), when the user makes a hand gesture 913a indicating a motion recognition start within the user's region of interest, the motion recognition mode can be changed to an ON state, and then when the user makes a hand gesture indicating a thumb-down within the user's region of interest, the hand gesture indicating thumb-down can be identified using the motion identification model. The processor can control the camera 510 to decrease a time-lapse photographing speed by a preset range to perform photographing, and change the motion recognition mode to an OFF state. Then, when a hand gesture indicating a motion recognition start, a thumb-up/down, or OK is not recognized for a preset period of time, for example, within 10 seconds, the time-lapse photographing speed adjustment can be automatically stopped to continuously perform photographing at a currently adjusted photographing speed value.

In addition, according to an embodiment of the present disclosure, the processor of the artificial intelligence range hood 100 can determine whether the user has made hand gestures in a preset sequence to control the operation of the camera 510 based on the preset sequence of hand motions. For example, when the user sequentially makes hand gestures indicating motion recognition start, zoom-out, and zoom-in, the camera 510 can be controlled to zoom in a screen on which the user's region of interest is displayed by a preset ratio to perform photographing. Furthermore, when the user sequentially makes hand gestures indicating motion recognition start, zoom-in, and zoom-out, the camera 510 can be controlled to zoom out a screen on which the user's region of interest is displayed by a preset ratio to perform photographing.

As shown in FIG. 9C(a), when the user makes a hand gesture 914a indicating a motion recognition start within the user's region of interest, the motion recognition mode can be changed to an ON state, and then when the user subsequently makes a hand gesture 914b indicating a zoom-out within the user's region of interest, the hand gesture indicating a zoom-out can be identified using a motion identification model to change the zoom-in/zoom-out motion recognition mode to an ON state. When the user makes a hand gesture 914c indicating a zoom-in within the user's region of interest, whether the zoom-in/zoom-out motion recognition mode is in an ON state can be checked, and when the recognition mode is in an ON state, the processor can control the camera 510 be controlled to zoom in a cooking screen by a preset ratio to perform photographing in response to the hand gesture 914c indicating a zoom-in to change the motion recognition mode and the zoom-in/zoom-out motion recognition mode to an OFF state.

Furthermore, referring to FIG. 9C(b), when the user makes a hand gesture 915a indicating a motion recognition start within the user's region of interest, the motion recognition mode can be changed to an ON state, and then when the user subsequently makes a hand gesture 915b indicating a zoom-in within the user's region of interest, the hand gesture indicating a zoom-out can be identified using a motion identification model to change the zoom-in/zoom-out motion recognition mode to an ON state. When the user makes a hand gesture 915c indicating a zoom-out within the user's region of interest, whether the zoom-in/zoom-out motion recognition mode is in an ON state can be determined, and when the mode is in an ON state, the processor can control the camera 510 to zoom out the screen by a preset ratio to perform photographing in response to the hand gesture 915c indicating zoom-in to change the motion recognition mode and the zoom-in/zoom-out motion recognition mode to an OFF state.

Next, a method of generating motion identification information using a motion identification model will be described with reference to FIG. 9D. In particular, FIG. 9D(a) illustrates a method of generating motion identification information on a user's hand gesture included in image data using a motion identification model, and FIG. 9D(b) illustrates an embodiment of training a motion identification model.

Figure 9D:
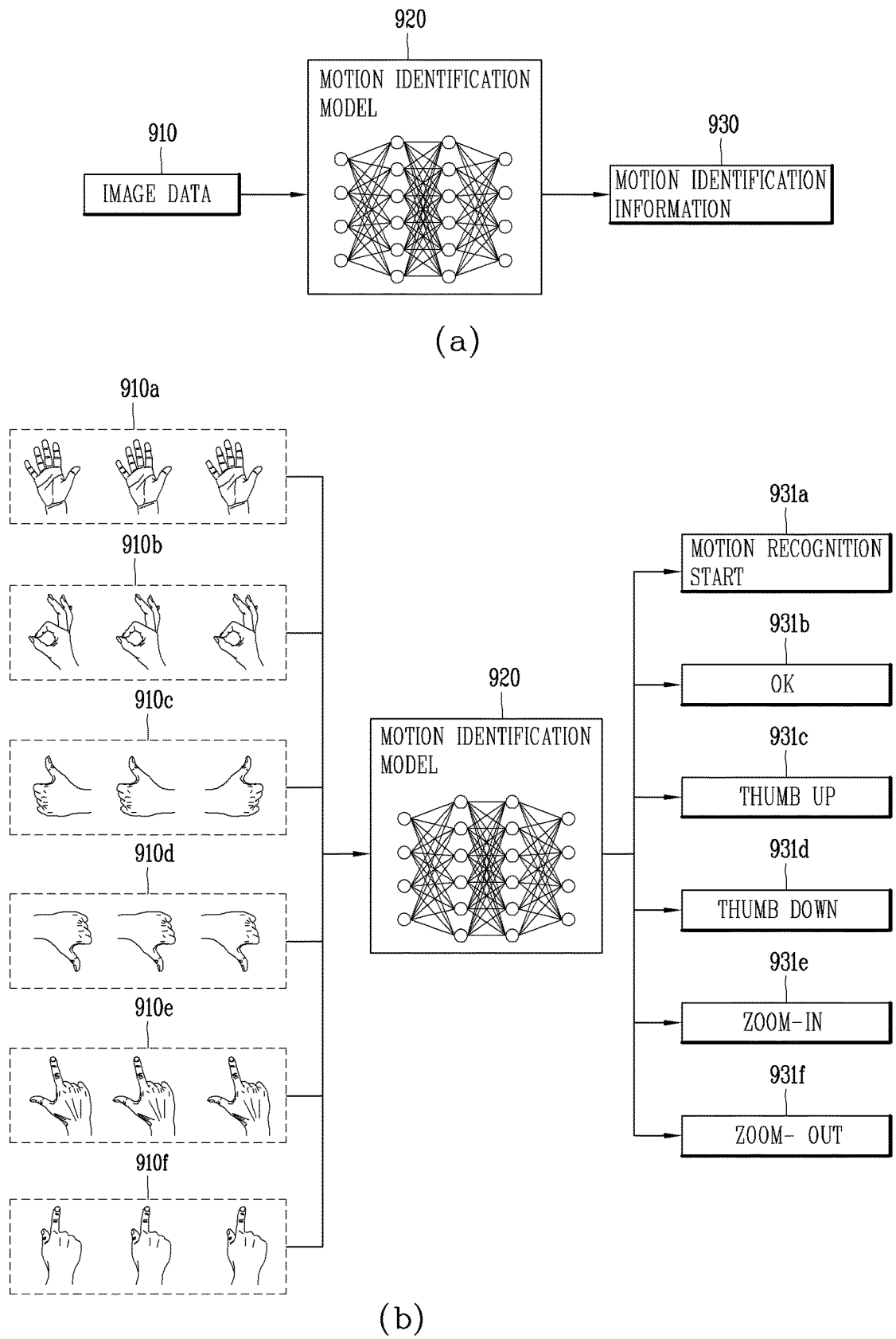
FIG. 9D is a conceptual view illustrating a method of generating motion identification information using a motion identification model.

Referring to FIG. 9D(a), the processor of the artificial intelligence range hood 100 recognizes a hand region included in image data 910 using a motion identification model 920 to generate motion identification information 930. The motion identification model 920 can be trained using the image data 910 including the hand region and learning data labeled with motion identification information 930 on the hand region included in the image data 910.

For example, FIG. 9D(b) illustrates an embodiment of training a motion recognition model 920 using training image data 910a to 910f and training motion identification information 931a to 931f labeled on the training image data 910a to 910f. Here, the training motion identification information 931a to 931f can include at least one of motion recognition start, OK, thumb-up, thumb-down, and zoom-in/zoom-out. Then, when image data including an image of the user's hand motion acquired by the camera 510 is received, motion identification information corresponding to the relevant hand gesture is generated.

Figure 10A:
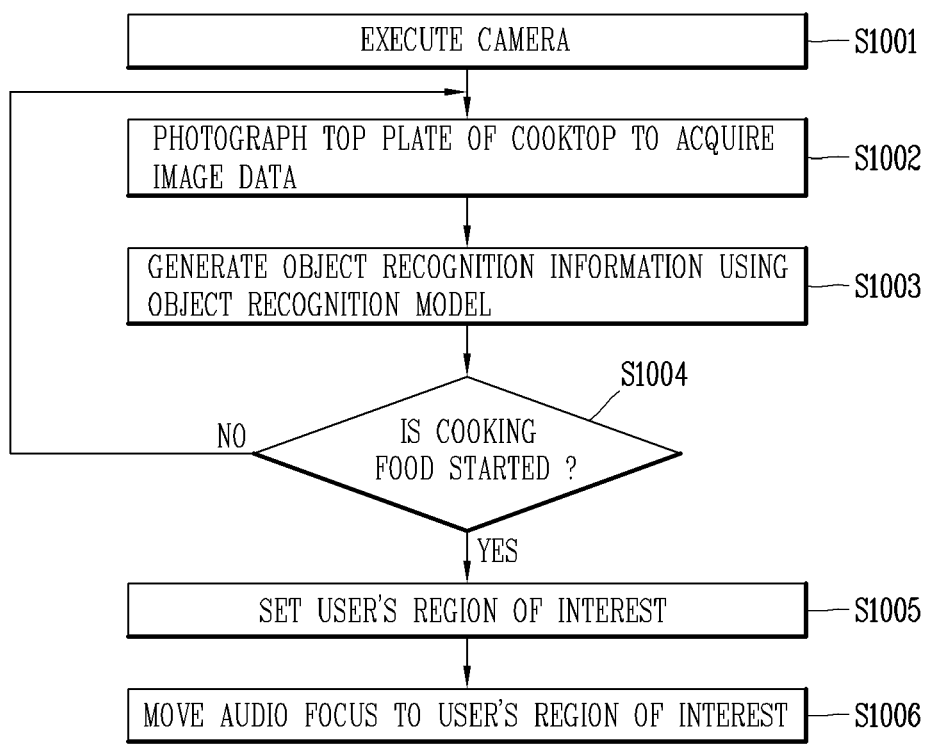
FIG. 10A is an operation flowchart illustrating a method of recording a sound generated during cooking using a directional microphone according to an embodiment of the present disclosure.

Hereinafter, a method of recording sound generated during food cooking using a directional microphone in the artificial intelligence range hood 100 will be described with reference to FIGS. 10A and 10B. Referring to FIG. 10A, the processor of the artificial intelligence range hood 100 can control the camera 510 (S1001) to photograph a top plate region of the cooktop 550 and acquire image data (S1002). Next, object recognition information on a plurality of cooking zones, cooking vessels, cooking utensils, food, and a user's hands included in the image data can be generated (S1003).

The processor can then determine whether the user has started cooking a food (S1004). When the processor determines that the user has started cooking a food (Yes in S1004), one of regions of the top plate region of the cooktop 550 including at least one of one or more cooking zones, cooking vessels, or food recognized as being cooked through the display can be received as a user input and set as the user's region of interest (S1005).

When the processor determines that the user's region of interest is set, the processor can move the audio focus of a plurality of microphones 530 provided in the artificial intelligence range hood 100 to the user's region of interest (S1006). That is, the audio focus of the microphones 530 can be moved to the user's region of interest including a cooking zone recognized as being cooked, thereby mainly recording a cooking-related sound generated from the user's cooking zone of interest.

Furthermore, the processor can control the camera 510 to further receive photographing conditions including a time-lapse photographing speed and a photographing mode as a user input to photograph the user's region of interest. The cooking-related sound that is focused and recorded in the user's region of interest can also be included in an image photographed by the camera 510 and stored in the memory.

Figure 10B:
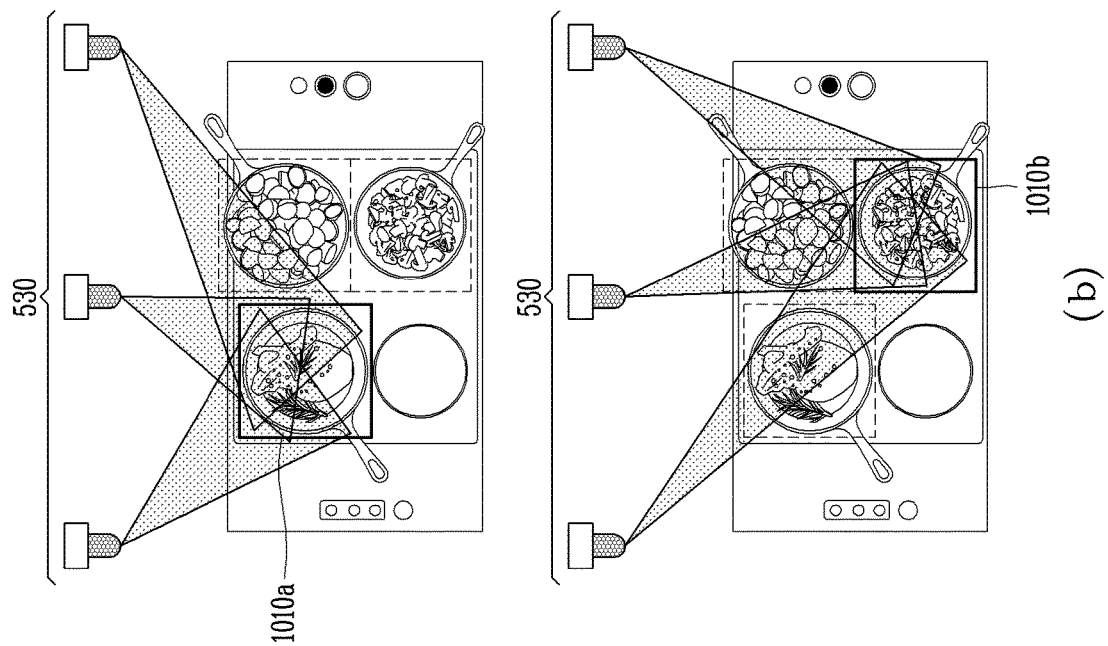
FIG. 10B includes overviews illustrating an audio focus of the microphone being moved to a user's region of interest.
Figure 10B:
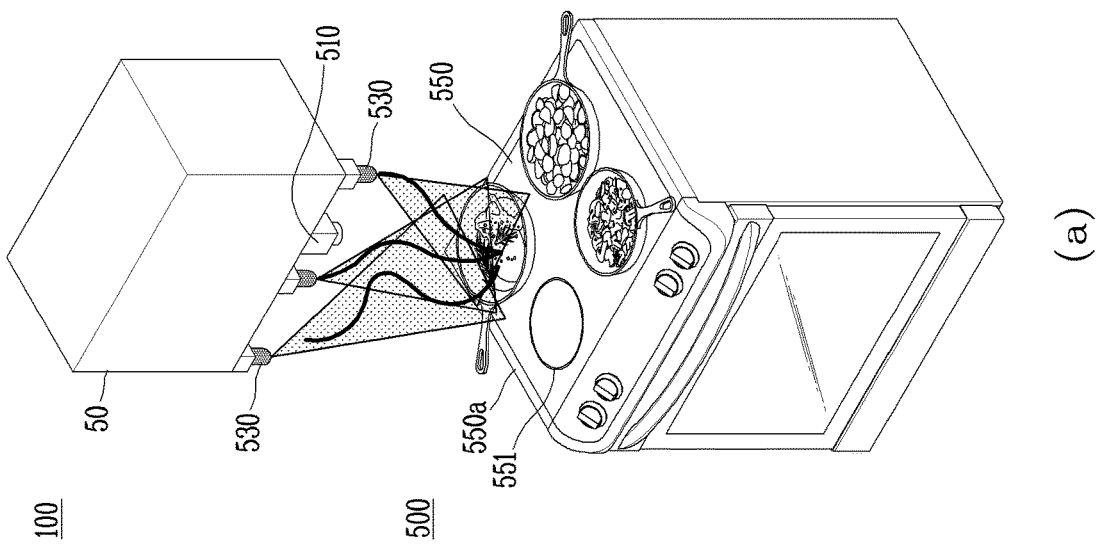

FIG. 10B illustrates an embodiment in which the audio focus of a plurality of microphones 530 is moved to a user's region of interest based on the user's region of interest being set. Referring to FIG. 10B(a) and (b), a plurality of directional microphones 530 for receiving audio signals generated from the top plate 550a of the cooktop 550 can be located at a lower end of the main body 50 of the artificial intelligence range hood 100.

When cooking starts on the top plate 550a of the cooktop 550, and the user's regions of interest 1010a and 1010b are set, the audio focus of the microphones 530 can be moved to the user's regions of interest 1010a to 1010b. That is, the audio focus of the microphones 530 can be adjusted to mainly receive sounds generated from the user's regions of interest 1010a to 1010b.

Hereinafter, a method of analyzing a photographed cooking video in the artificial intelligence range hood 100 to generate a highlight clip will be described with reference to FIGS. 11A and 11B. First, FIG. 11A illustrates a method of identifying a section with a large change in a cooking process in a cooking video photographed by the camera 510 in the artificial intelligence range hood 100.

Figure 11A:
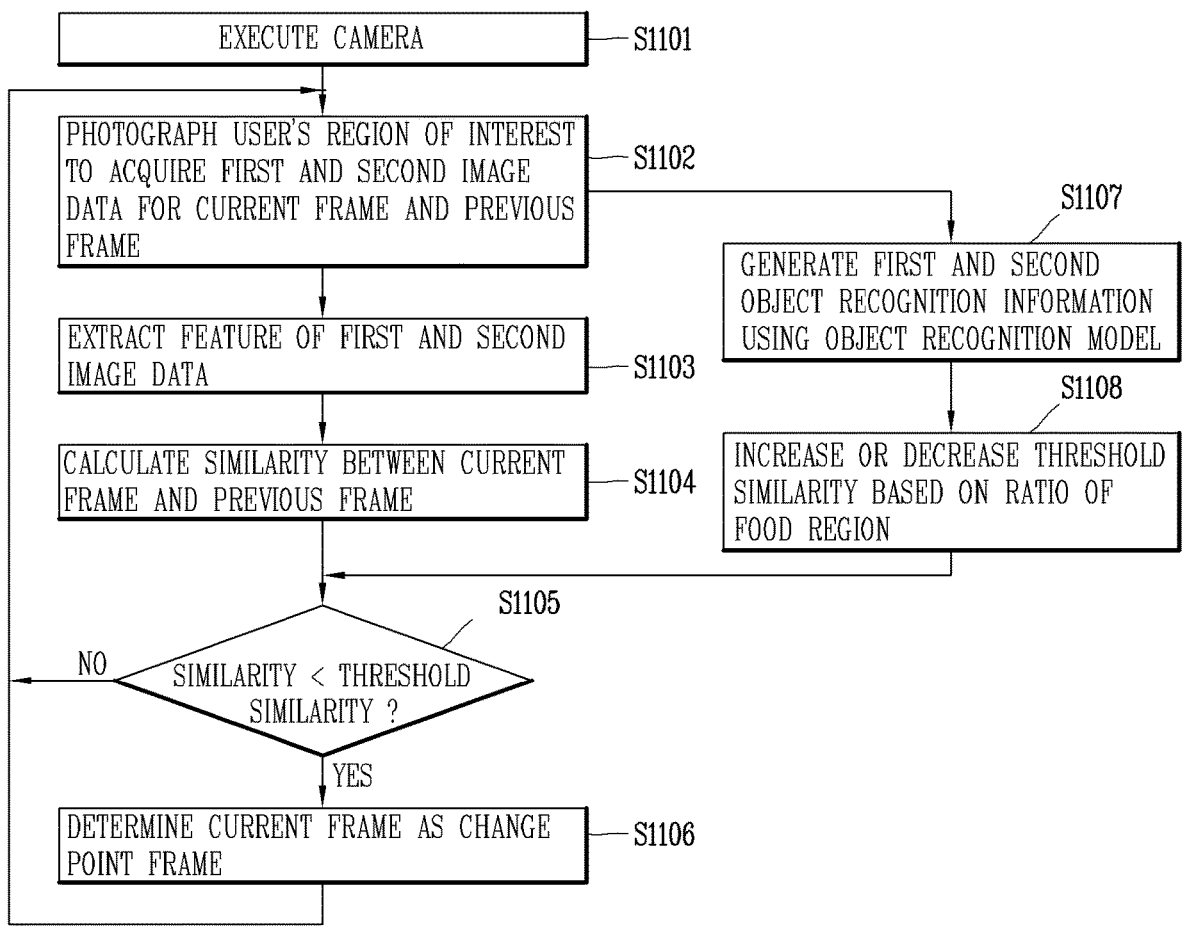
FIG. 11A is an operation flowchart illustrating a method of identifying a section with a large change in a cooking process in a cooking video photographed by a camera according to an embodiment of the present disclosure.

Referring to FIG. 11A, the processor of the artificial intelligence range hood 100 can control the camera 510 (S1101) to acquire image data including a user's region of interest (S1102). The image data can include first image data for a current frame photographed and received by the camera 510 and second image data for a previous frame received prior to the current frame.

Next, the processor of the artificial intelligence range hood 100 can analyze the acquired first and second image data to extract the feature of the first and second image data including at least one of a color, an edge, a histogram, a correlation, and a motion vector of an optical flow (S1103).

The processor can then calculate a similarity between a current frame and a previous frame based on the feature of first and second image data (S1104) and determine whether the similarity is above a preset threshold similarity (S1105).

When the processor determines the similarity between a current frame and a previous frame is greater than a preset threshold similarity (Yes in S1105), the processor determines that the current frame has a smaller number of change points compared to the previous frame, and returns to acquiring image data (S1102).

When the processor determines the similarity between the current frame and the previous frame is less than a preset threshold similarity (No in S1105), the processor determines that the current frame has more change points compared to the previous frame, and determines the current frame as a change point frame (S1106) and stores it in the memory.

Also, a threshold similarity for determining the similarity calculation between the current frame and the previous frame can be determined based on first and second object recognition information generated from the first and second image data of the current frame and the previous frame. Specifically, the processor of the artificial intelligence range hood 100 can generate first and second object recognition information on an object included in the first and second image data using an object recognition model (S1107).

Next, the processor can calculate ratios occupied by a food region in the user's region of interest based on the first and second object recognition information, and increase or decrease a threshold similarity, which is a reference for calculating the similarity between the current frame and the previous frame according to the ratio occupied by the food region, by a preset range (S1108). For example, when a ratio occupied by a food region in the user's region of interest is 70% or more, it is highly likely that one or more ingredients used for the food are mostly included in the cooking vessel so as to be in a cooking completion step, such as boiling or baking. That is, it is highly likely to be a highlight section during the cooking process.

The threshold similarity can be decreased by a preset first range to determine a change point frame, thereby increasing a probability of generating an important process during the cooking process as a highlight clip. In addition, when a ratio occupied by a food region in the user's region of interest is 70% or less, the processor determines that a change in the cooking process is small, and can increase the threshold similarity by a preset second range to determine the change point frame. The first range can be set to be less than the second range, but the present disclosure is not limited thereto.

Figure 11B:
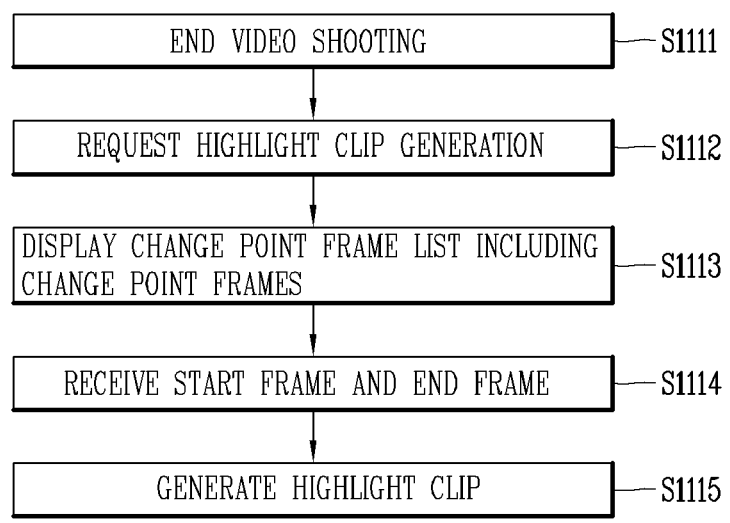
FIG. 11B is an operation flowchart illustrating a method of generating a highlight clip after photographing is finished.

Next, FIG. 11B illustrates a method of generating a highlight clip using one or more change point frames stored in the memory after video shooting is finished. Referring to FIG. 11B, the processor of the artificial intelligence range hood 100 can display a pop-up message asking the user whether to generate a highlight clip on the display when video shooting is finished (S111).

When the user requests the generation of a highlight clip (S1112), the processor can extract one or more change point frames stored in the memory. Next, the processor can generate a change point frame list including the extracted one or more change point frames and displayed the list on the display 520 (S1113). Next, the processor can receive a start frame and an end frame in the change point frame list displayed on the display as a user input (S1114) to generate a highlight clip (S1115).

Figure 12A:
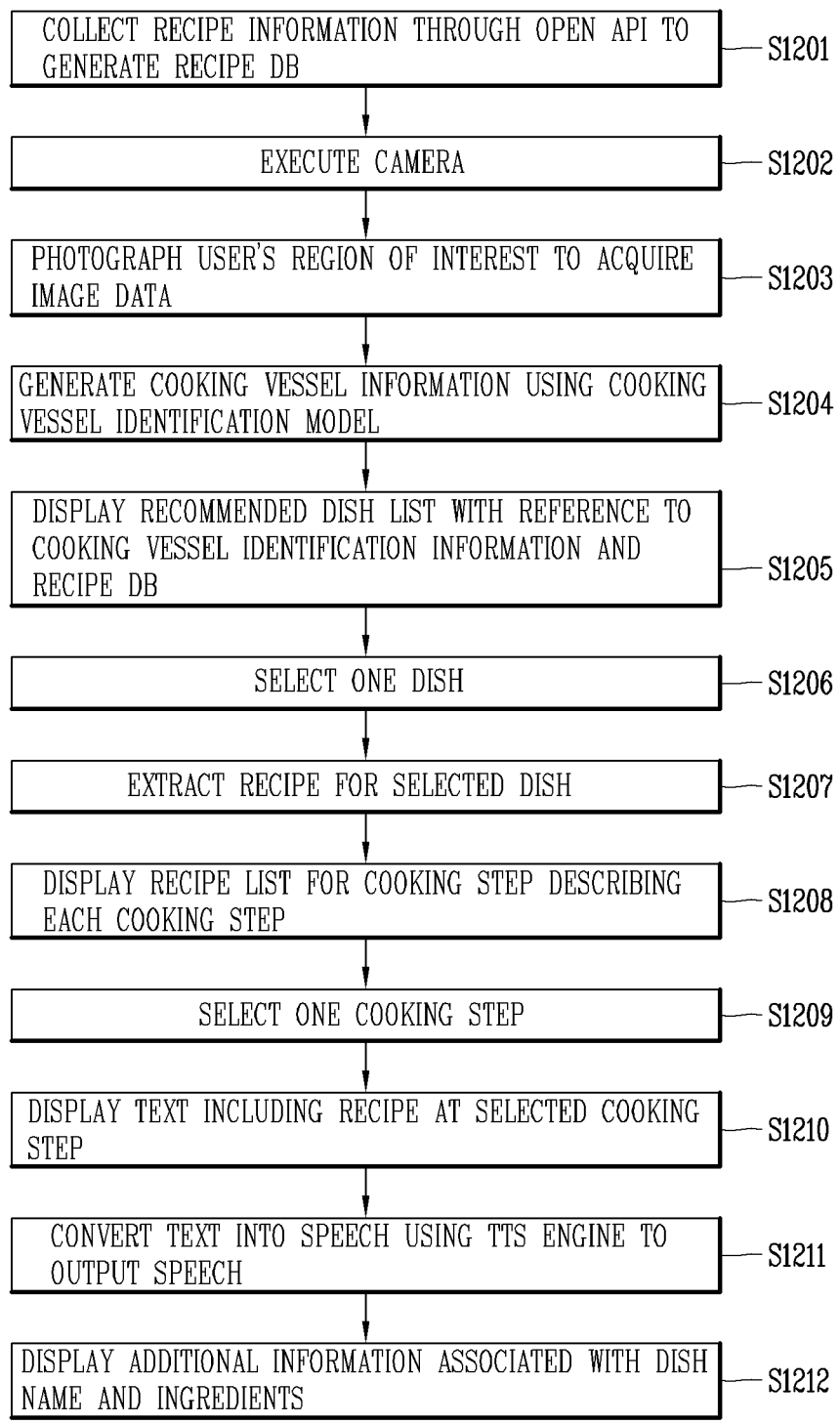
FIG. 12A is an operation flowchart illustrating a method of providing a recommended recipe and information on ingredients used in the recipe using an open API according to an embodiment of the present disclosure.

Hereinafter, a method of providing a recommended recipe and information on ingredients used in the recipe using an open API in the artificial intelligence range hood 100 will be described with reference to FIGS. 12A and 12B. Referring to FIG. 12A, the processor of the artificial intelligence range hood 100 can collect recipe information from a cooking food recipe DB of a server of the Ministry of Food and Drug Safety using an open API provided by the Ministry of Food and Drug Safety. Next, the processor can generate a recipe DB based on the collected recipe information (S1201) and store the generated recipe DB in the memory.

Hereinafter, an embodiment of collecting recipe information from the Ministry of Food and Drug Safety DB using an open API to generate a recipe DB by will be described with reference to FIG. 12B. Referring to FIG. 12B, the processor of the artificial intelligence range hood 100 can allow the input of a cooking name 1251 through an open API provided by the Ministry of Food and Drug Safety so as to collect recipe information 1270 including a cooking method 1252, ingredient information 1253, nutrient information 1254*a* to 1254*c*, calories 1255, or at least one of one or more images 1256*a* to 1256*b* specifically illustrating a cooking method for each cooking step and texts 1257*a* to 1257*b* describing the cooking method. The cooking method 1252 included in the recipe information 1270 can include at least one of baking, boiling, steaming, roasting, frying, and the like, and the nutrient information 1254*a* to 1254*c* can include at least one of carbohydrate information 1254*a*, fat information 1254*b*, protein information 1254*c*, and the like.

Next, the processor can generate a recipe DB 1280 based on the collected recipe information 1270 as illustrated in FIG. 12C and store the recipe DB 1280 in the memory of the artificial intelligence range hood 100. The generated recipe DB 1280 includes a dish name 1291, a cooking method 1292, ingredient information 1293, one or more nutrient information 1294*a* to 1294*c*, calories 1295, a plurality of images 1296*a* to 1296*b* illustrating a cooking method, and a plurality of texts 1297*a* to 1297*b* describing the cooking method.

In addition, the processor of the artificial intelligence range hood 100 can generate a DB item 1298 related to a cooking vessel corresponding to the cooking method 1252 included in the collected recipe information 1270 to be further included in the recipe DB 1280. For example, in response to a cooking method of "steaming," a cooking vessel item called "steamer" can be generated to be further included in the recipe DB 1280. In the same way, among the cooking methods included in the recipe information 1270, baking, boiling, steaming, roasting, and frying can correspond to one or more cooking vessel items 1298 classified as a frying pan, a pot, a steamer, a cooker, respectively, to be stored in the recipe DB 1280.

The recipe DB 1280 can include a first DB set (a), a second DB set (b), and a third DB set (c). Here, the first DB set (a) to the third DB set (c) can include dish names, cooking methods, ingredient information, one or more nutrient information, calories, and some items of one or more images illustrating the cooking methods, and one or more texts describing the cooking methods, respectively, in association with first to third recipes.

Next, referring back to FIG. 12A, the processor of the artificial intelligence range hood 100 can control the camera 510 (S1202) to acquire image data by photographing a user's region of interest (S1203). The processor can then generate cooking vessel identification information on a cooking vessel included in the image data using cooking vessel identification model stored in the memory (S1204). The cooking vessel identification information can include at least one of a frying pan, a pot, a steamer, and a cooker.

Also, the processor can generate a list of recommended dishes by referring to the generated cooking vessel identification information and the recipe DB stored in the memory to display the list on the display (S1205). Specifically, cooking vessel items matching the cooking vessel identification information can be retrieved from the recipe DB to extract one or more dish names corresponding to the retrieved cooking vessel items. For example, when the cooking vessel identification information is "steamer", the processor can extract one or more dish names corresponding to the cooking vessel "steamer" from the recipe DB. One or more dish names extracted by the foregoing method can be included in a list of recommended dishes and provided to the user through the display.

In addition, the processor of the artificial intelligence range hood 100 can generate a list of recommended dishes based on at least one of weather information collected from the server of the Meteorological Administration or search results collected by a user directly searching the web through the display of the artificial intelligence range hood 100 to further display the list of recommended dishes on the display.

When the user selects one dish from the list of recommended dishes (S1206), the processor can extract a recipe corresponding to the name of the selected dish from the recipe DB (S1207). Next, the processor can generate a recipe list for each cooking step by referring to the extracted recipe to display the recipe list on the display (S1208). Specifically, the recipe list for each cooking step can be generated based on a plurality of images illustrating a cooking method included in the recipe DB and a plurality of texts describing the cooking method.

For example, referring to FIG. 12C, the recipe DB set (a) corresponding to a dish name "soybean paste sauce cabbage rolls with snails" can include at least one of a first image 1296*a* illustrating a cooking method performed in a first cooking step and a first text 1297*a* describing the cooking method performed in the first cooking step. Furthermore, at least one of a second image 1296*b* illustrating a cooking method performed in a second cooking step and a second text 1297*b* describing the cooking method performed in the second step can be included therein.

The processor can generate a first cooking step recipe including the first image 1296*a* or the first text 1297*a* and a second cooking step recipe including the second image 1296*b* and the second text 1297*b*, and generate a recipe for each cooking step including the first and second cooking step recipes in the form of a list and provide the list to the user.

Referring back to FIG. 12A, when the user selects one cooking step from the recipe list for each cooking step displayed on the display 520 (S1209), the processor of the artificial intelligence range hood 100 can display a text describing a cooking method used in the selected cooking step on the display (S1210).

In addition, the text describing the cooking method can be converted into a speech to be output through one or more speakers provided in the artificial intelligence range hood 100 (S1211). Specifically, the processor of the artificial intelligence range hood 100 can convert text data into speech data using a text-to-speech (TTS) engine for converting a text string into a speech. The TTS engine can be configured with an artificial neural network trained according to a machine learning algorithm. In addition, it can be trained by a learning processor, trained by a learning processor of the AI server, or trained by distributed processing thereof.

Further, the processor of the artificial intelligence range hood 100 can store one or more TTS engines in the memory. For example, a TTS engine corresponding to the news style of a male/female announcer, a TTS engine corresponding to the storytelling style of a voice actor, and a TTS engine corresponding to the entertainment style of an entertainer can be stored therein.

Accordingly, the processor can convert a text describing a cooking method into a speech corresponding to various styles using one of the plurality of TTS engines stored in the memory through the foregoing method, and output the speech through a plurality of speakers provided in the artificial intelligence range hood 100. Furthermore, the speech describing the cooking method output through the plurality of speakers can be included in an image photographed by the camera 510 to be stored in the memory.

Next, the processor can further generate additional information on the selected dish and one or more ingredients used in the dish to display the additional information on the display (S1212). The additional information on the dish and the ingredients used in the dish can be collected from a recipe DB stored in the memory, a server of the Ministry of Food and Drug Safety, or an external web server, and can include news, price information, nutritional information, allergy information, and the like, which are associated with the dish and the ingredients, but the present disclosure is not limited thereto.

Figure 12D:
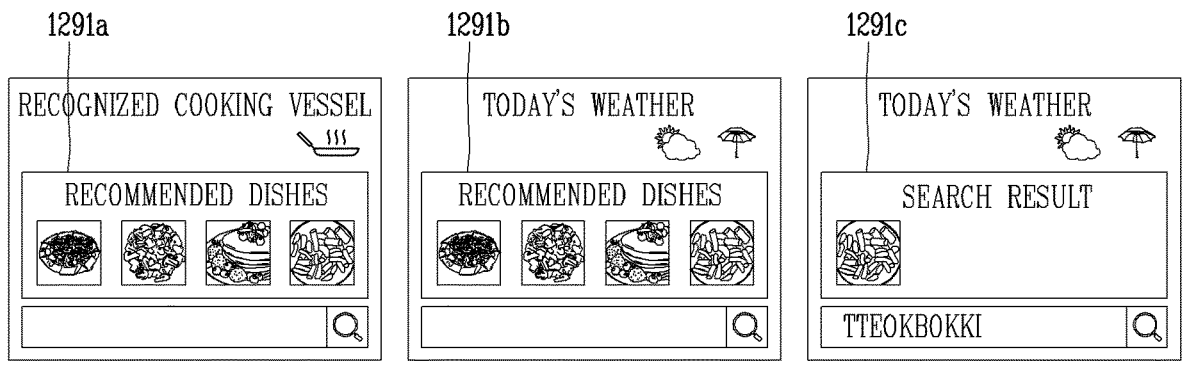
FIG. 12D is an exemplary view illustrating a screen on which a list of recommended dishes and recipes are provided.
Figure 12D:
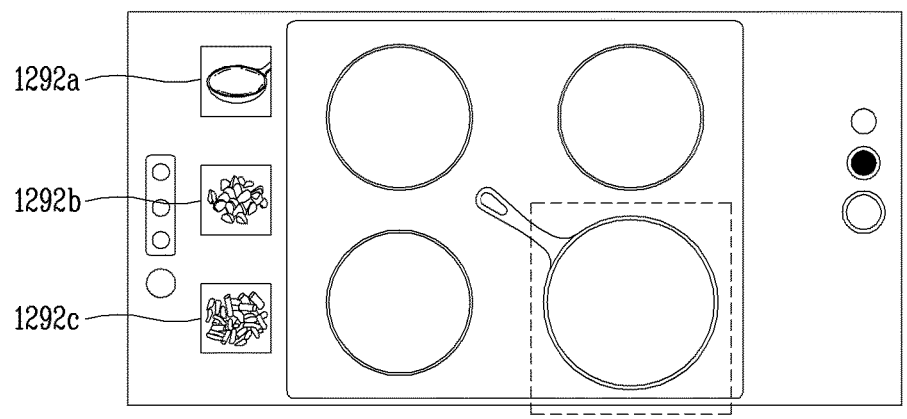

FIG. 12D illustrates an embodiment in which the artificial intelligence range hood 100 displays a list of recommended dishes based on recipe information collected using an open API on the display and provides information on a dish selected by a user. In particular, FIG. 12D(a) illustrates an embodiment in which the processor of the artificial intelligence range hood 100 displays a list of recommended dishes 1291*a* associated with a cooking vessel located in a user's region of interest on the display 520.

As illustrated in FIG. 12D(a), the processor can further display a list of recommended dishes 1291*b* generated based on weather information collected from the server of the Meteorological Administration. In addition, a list of recommended dishes 1291*c* generated based on a search result collected by a user directly searching the web through the display 520 can be further displayed on the display.

Next, FIG. 12D(b) illustrates an embodiment in which a recipe related to a selected dish is displayed in response to a user selecting one dish from a list of recommended dishes. Specifically, the recipe used for the selected dish can be displayed in the form of a list including an image illustrating a cooking method for each cooking step and a text describing the cooking method.

For example, in FIG. 12D(a), when the user selects "tteokbokki" from the list of recommended dishes, a recipe corresponding to the dish name "tteokbokki" can be extracted from the recipe DB. A recipe corresponding to "tteokbokki" can include an image illustrating a cooking method for each cooking step and a text describing the cooking method. Specifically, during the process of cooking "tteokbokki," a first image illustrating a cooking method performed in a first cooking step and a first text describing the cooking method performed in the first cooking step can be included to generate a first cooking step recipe. In a similar way, second and third cooking step recipes including second and third images illustrating cooking methods performed in second and third cooking steps and second and third texts describing the cooking methods performed in the second and third cooking steps, respectively, can be generated and displayed on the display 520.

Referring to FIG. 12D(b), first to third cooking step recipes 1292*a* to 1292*c* generated by the foregoing method can be displayed on the display 520 in the form of a list and can be scrolled by a user's touch input, but the present disclosure is not limited thereto. Also, FIG. 12D(c) illustrates an embodiment in which, when a user selects one cooking step recipe from a recipe list for each cooking step, a text 1294 describing a cooking method included in the selected cooking step recipe is displayed on the display 520. In addition, the text 1294 describing the cooking method can be converted into a speech using a TTS engine and simultaneously output through a plurality of speakers. In this instance, when the user selects a video shooting button 1295, a speech output through the plurality of speakers can be included in a file and stored in the memory when an image captured and generated by the camera 510 is stored in the memory as the file.

In addition, additional information associated with a dish called "tteokbokki" and one or more ingredients used in "tteokbokki" can be collected and further displayed as a thumbnail 1296 or text 1297 on the display 520. For example, news, price information, nutritional information, allergy information, and the like, which are associated with a dish called "tteokbokki" or one or more ingredients used in "tteokbokki," can be retrieved from a recipe DB stored in the memory, a server of the Ministry of Food and Drug Safety, or an external web server and displayed as a thumbnail 1296 or text 1297 on the display 520.

In addition, the additional information associated with ingredients displayed on the display 520 can be generated by identifying the types of ingredients included in image data acquired by photographing the user's region of interest. Specifically, the processor of the artificial intelligence range hood 100 can generate ingredient identification information for identifying the types of ingredients included in image data captured and acquired by the camera 510 using an ingredient identification model stored in the memory.

Based on the generated ingredient identification information, news, price information, nutritional information, allergy information, and the like, which are associated therewith, can be extracted from a recipe DB stored in the memory, a server of the Ministry of Food and Drug Safety or an external web server and further displayed on the display 520.

Figure 13A:
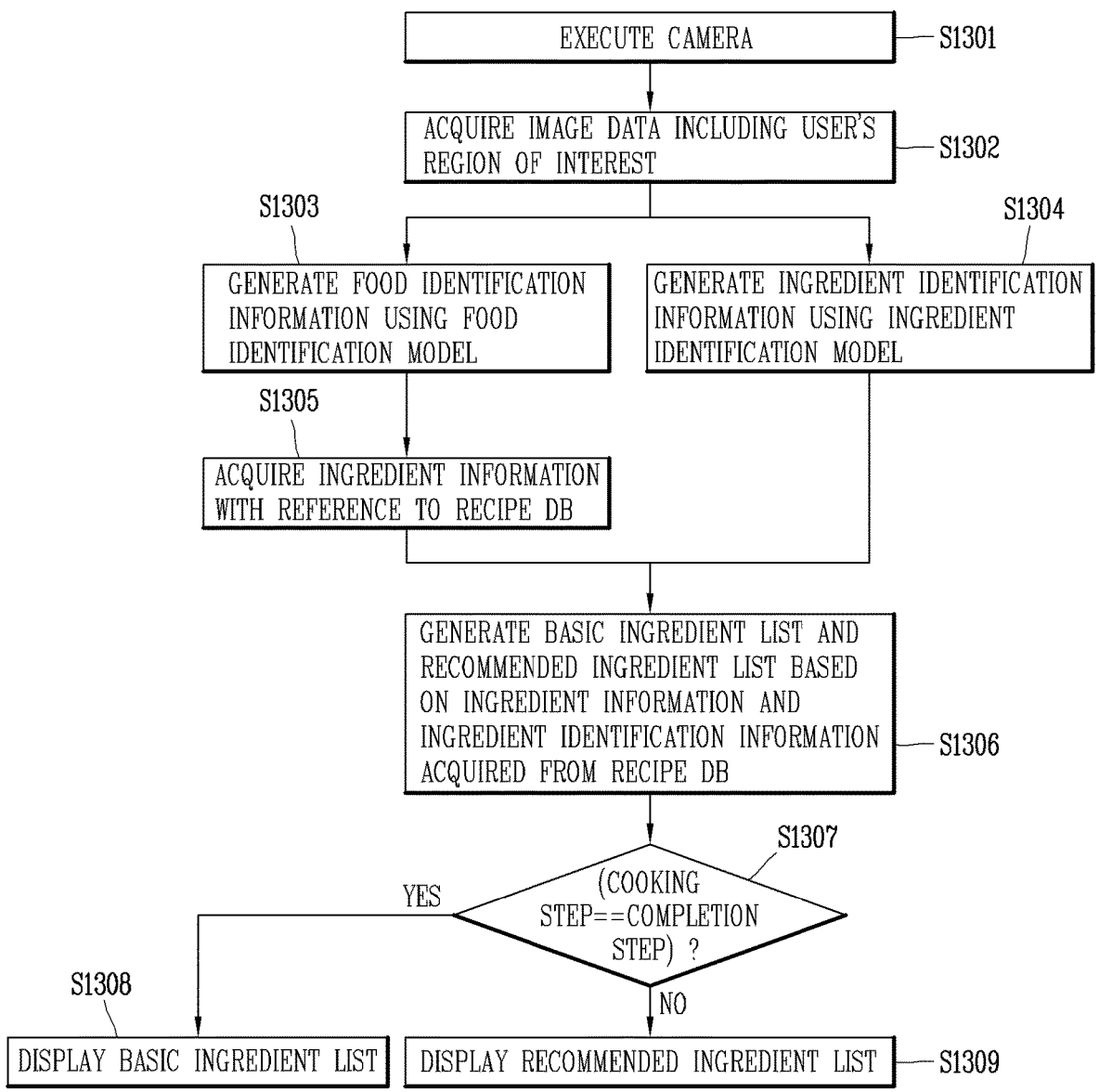
FIG. 13A is an operation flowchart showing a method of identifying one or more ingredients included in a food to provide a recommended ingredient list.

Hereinafter, a method of identifying one or more ingredients included in a food in the artificial intelligence range hood 100 to provide a recommended ingredient list will be described with reference to FIGS. 13A and 13B. Referring to FIG. 13A, the processor of the artificial intelligence range hood 100 can execute the camera 510 (S1301) to acquire image data by photographing a user's region of interest (S1302).

Next, the processor can generate food identification information for identifying a food included in the image data using the food identification model stored in the memory (S1303). Furthermore, ingredient identification information for identifying the types of one or more ingredients included in the image data can be generated using the ingredient identification model stored in the memory (S1304).

Next, the processor can acquire ingredient information corresponding to the generated food identification information from a recipe DB stored in the memory (S1305). For example, referring to FIG. 12B, "soybean paste sauce cabbage rolls with snails" corresponding to food identification information can be input as a dish name to the recipe DB 1280 to acquire ingredient information including pork (50 g), cabbage (5 leaves), leeks (30 g), rice (100 g), onions (50 g), zucchini (½), snails (100 g), and soybean paste (30 g).

Referring back to FIG. 13A, the processor of the artificial intelligence range hood 100 can compare ingredient information acquired from the recipe DB with ingredient identification information for identifying the types of ingredients included in image data acquired by photographing the user's region of interest to generate a basic ingredient list and a recommended ingredient list (S1306). For example, when the ingredient information acquired from the recipe DB includes "pork (50 g), cabbage (5 leaves), leeks (30 g), rice (100 g), onions (50 g), zucchini (½), snails (100 g), soybean paste (30 g)", a basic ingredient information including "pork (50 g), cabbage (5 leaves), leeks (30 g), rice (100 g), onions (50 g), zucchini (½), snails (100 g), and soybean paste (30 g)" in sequence can be generated.

In addition, a recommended ingredient list can be generated by changing the sequence of one or more ingredients included in the basic ingredient list and provided to the user. For example, when the ingredient information obtained from the recipe DB includes "pork (50 g), cabbage (5 leaves), leeks (30 g), rice (100 g), onions (50 g), zucchini (½), snails (100 g), soybean paste (30 g)", and the ingredient identification information generated from the image data includes "pork, cabbage leaves, leeks, and rice", "onions, zucchini, snails, and soybean paste" will be identified as ingredients to be added. In this case, a recommended ingredient list can be generated by arranging ingredients identified as ingredients to be added in a higher sequence in the basic ingredient list.

Next, the processor according to an embodiment of the present disclosure can determine whether a current cooking step is a completion step (S1307) to display a basic ingredient list or a recommended ingredient list on the display. Whether the current cooking step is a completion step can be determined in consideration of a ratio of the ingredients identified as ingredients to be added. Specifically, when the number of the ingredients identified as ingredients to be added among the number of ingredients included in the basic ingredient list is less than a predetermined ratio, the processor can determine that the number of ingredients to be added is small. Accordingly, the user can easily recognize ingredients to be added by determining that a current cooking step is a completion step, arranging the ingredients to be added in a higher sequence, and displaying a recommended ingredient list on the display 520.

Furthermore, whether the current cooking step is a completion step can be determined in consideration of a ratio occupied by a food region included in image data acquired by photographing a user's region of interest, but the present disclosure is not limited thereto. Also, one or more ingredients included in the basic ingredient list and the recommended ingredient list generated by the foregoing method can be displayed in the form of stickers, respectively, and moved to a screen where a user's region of interest is displayed by a user's drag input. In addition, the ingredient sticker moved to the user's region of interest can be included in a photo or video photographed by the camera 510 and stored in the memory.

FIG. 13B illustrates an embodiment of displaying a basic ingredient list and a recommended ingredient list on the display. As illustrated in FIG. 13B(a), the processor of the artificial intelligence range hood 100 can generate a basic ingredient list 1311 in which ingredient information acquired from a recipe DB is sequentially arranged to display the generated basic ingredient list on the display.

Furthermore, as shown in FIG. 13B(b), a recommended ingredient list 1323 in which ingredients to be added are arranged 1324 in a higher sequence can be generated and displayed on the display 520. The processor can generate guide information 1325 for guiding the ingredient to be added to further display the guide information on the display 520.

The foregoing present disclosure can be implemented as computer-readable codes in a program-recorded medium. The computer-readable media includes all types of recording devices in which data readable by a computer system can be stored. Examples of such computer-readable media include hard disk drive (HDD), solid state disk (SSD), silicon disk drive (SDD), ROM, RAM, CD-ROM, magnetic tape, floppy disk, optical data storage element and the like. Furthermore, the computer can include a processor of an artificial intelligence range hood.

The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

What is claimed is:

1. An artificial intelligence range hood comprising:
a main body;
a camera disposed at a lower end of the main body and configured to capture an image of a cooktop located under the main body;
a display located on a front surface of the main body;
a memory storing an object recognition model; and
a processor configured to:
control the camera to capture the image of the cooktop,
generate object recognition information for recognizing cooking objects included the captured image of the cooktop using the object recognition model stored in the memory,
set a user region of interest of the captured image corresponding to a recognized cooking object designated by the generated object information,
control an operation of the camera to photograph the user region of interest of the captured image, and
control the display to display the photographed user region of interest of the captured image.

2. The artificial intelligence range hood of claim 1, wherein the object recognition information comprises object identification information and object location information on the cooking objects included in the captured image, and
wherein the object identification information designates at least one of a cooking vessel, a food, a cooking utensil, and a user's hand.

3. The artificial intelligence range hood of claim 1, wherein the recognized cooking object comprises least one of one or more cooking zones, cooking utensils, and food being cooked, and
wherein the user region of interest includes the recognized cooking object.

4. The artificial intelligence range hood of claim 2, wherein the processor controls the operation of the camera to photograph the user region of interest of the captured image in response to a user input including a time-lapse photographing speed and a photographing mode.

5. The artificial intelligence range hood of claim 4, wherein the processor calculates a ratio of a region occupied by a food and a ratio of a region occupied by an object other than the food, respectively, within the user region of interest using the object identification information and the object location information, increases the time-lapse photographing speed when the ratio of the region occupied by the food is greater than a preset first threshold, and decreases the time-lapse photographing speed when the ratio of the region occupied by the food is less than the first threshold and the ratio of the region occupied by the object other than the food is greater than a preset second threshold, and
   wherein the first threshold is set as a reference value for determining the region occupied by the food within the user region of interest, and the second threshold is set as a reference value for determining the region occupied by the object other than the food within the user region of interest.

6. The artificial intelligence range hood of claim 2, wherein the memory further stores a food identification model, and
   wherein when a food is included in the object identification information, the processor generates food identification information using the food identification model, and the food identification information identifies a type of the food included in the captured image.

7. The artificial intelligence range hood of claim 1, wherein the processor controls the display to display color correction filter lists, and applies a user-selected color correction filter to the user region of interest of the captured image.

8. The artificial intelligence range hood of claim 4, wherein the memory further stores a motion identification model,
   wherein when a user's hand is included in the object identification information, the processor generates motion identification information using the motion identification model,
   wherein the motion identification information identifies a motion type of the user's hand included in the captured image, and
   wherein the motion identification information comprising at least one of motion recognition start, thumb-up, thumb-down, zoom-in and zoom-out motions.

9. The artificial intelligence range hood of claim 8, wherein the processor changes a motion recognition mode to an ON state when the motion identification information is a motion recognition start motion, increases or decreases the time-lapse photographing speed when the motion identification information is one of a thumb-up and a thumb-down motion and the motion recognition mode is in the ON state, and zooms in or out a screen on which the user region of interest is displayed when the motion identification information is one of a zoom-in motion and a zoom-out motion and the motion recognition mode is in the ON state.

10. The artificial intelligence range hood of claim 1, further comprising:
   a plurality of directional microphones located at the lower end of the main body,
   wherein the processor controls the directional microphones to directionally record sounds from the cooking object included in the users region of the interest.

11. The artificial intelligence range hood of claim 1, wherein the processor calculates a similarity between a current frame and a previous frame from the captured image, determines the current frame as a first change point frame when the calculated similarity is less than a preset threshold similarity, and generates a highlight clip including the first change point frame.

12. The artificial intelligence range hood of claim 11, wherein the processor calculates the similarity between the current frame and the previous frame based on at least one of a color, an edge, a histogram, a correlation, and a motion vector of an optical flow extracted from image data for the current frame and the previous frame.

13. The artificial intelligence range hood of claim 11, wherein the processor generates first and second object recognition information for the current frame and the previous frame to calculate ratios occupied by a food region within the user region of interest, respectively, and increases or decreases the threshold similarity based on the calculated ratios, respectively.

14. The artificial intelligence range hood of claim 2, wherein the processor generates a recipe database based on recipe information collected through an open application program interface and stores the generated recipe database in the memory,
   wherein the memory further stores a plurality of recipes including one or more items of a dish name, a cooking method, ingredient information, images illustrating the cooking method, and text describing the cooking method in the recipe database, and
   wherein the processor further generates a cooking vessel item corresponding to the cooking method.

15. The artificial intelligence range hood of claim 14, wherein the memory further stores a cooking vessel identification model,
   wherein the processor generates cooking vessel identification information using the cooking vessel identification model when a cooking vessel is included in the object identification information, and
   wherein the cooking vessel identification information identifies a type of the cooking vessel included in the captured image.

16. The artificial intelligence range hood of claim 15, wherein the processor retrieves the cooking vessel item corresponding to the cooking vessel identification information from the recipe database to extract one or more dish names related to the retrieved cooking vessel item, and controls the display to display a list of recommended dishes including the extracted one or more dish names.

17. The artificial intelligence range hood of claim 16, wherein the processor receives one dish from the list of recommended dishes as a user input to extract a recipe related to the one dish received from the recipe database, and controls the display to display at least one image illustrating the cooking method included in the extracted recipe and the text describing the cooking method.

18. The artificial intelligence range hood of claim 17, further comprising:
   a plurality of speakers,
   wherein the processor converts the text describing the cooking method into a speech using a text to speech engine stored in the memory, and outputs the converted speech through the plurality of speakers.

19. The artificial intelligence range hood of claim 14, wherein the memory further comprises an ingredient identification model, and
   wherein when one or more ingredients are included in the object identification information, the processor generates one or more ingredient identification information using the ingredient identification model, and the ingredient identification information identifies the types of ingredients included in the acquired image data.

20. A method of controlling an artificial intelligence range hood including a main body; a camera disposed at a lower end of the main body and configured to capture an image of a cooktop located under the main body; a display located on a front surface of the main body; a memory storing an object recognition model; and a processor, the method comprising:

capturing, via the camera, the image of the cooktop;
generating, via the processor, object recognition information for recognizing cooking objects included the captured image of the cooktop using the object recognition model stored in the memory;
setting, via the processor, a user region of interest of the captured image corresponding to a recognized cooking object designated by the generated object information;
controlling, via the processor, an operation of the camera to photograph the user region of interest of the captured image; and
displaying the photographed user region of interest of the captured image on the display.

* * * * *